(12) United States Patent
Hiraoka et al.

(10) Patent No.: US 10,414,150 B2
(45) Date of Patent: Sep. 17, 2019

(54) ACTIVE-ENERGY-RAY-CURABLE COMPOSITION, COMPOSITION STORED CONTAINER, TWO-DIMENSIONAL OR THREE-DIMENSIONAL IMAGE FORMING APPARATUS, METHOD FOR FORMING TWO-DIMENSIONAL OR THREE-DIMENSIONAL IMAGE, AND CURED PRODUCT

(71) Applicants: Takao Hiraoka, Kanagawa (JP); Masato Iio, Kanagawa (JP); Daisuke Miki, Kanagawa (JP)

(72) Inventors: Takao Hiraoka, Kanagawa (JP); Masato Iio, Kanagawa (JP); Daisuke Miki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 298 days.

(21) Appl. No.: 15/196,863

(22) Filed: Jun. 29, 2016

(65) Prior Publication Data

US 2017/0008325 A1  Jan. 12, 2017

(30) Foreign Application Priority Data

Jul. 8, 2015  (JP) ................................ 2015-136642
Jan. 6, 2016  (JP) ................................ 2016-001309

(51) Int. Cl.
| | |
|---|---|
| *C08F 2/46* | (2006.01) |
| *C08F 2/50* | (2006.01) |
| *C08G 61/04* | (2006.01) |
| *B33Y 80/00* | (2015.01) |
| *C09D 167/00* | (2006.01) |
| *C08J 7/04* | (2006.01) |
| *B41J 2/01* | (2006.01) |
| *C08F 283/02* | (2006.01) |
| *C09D 11/101* | (2014.01) |
| *C09D 11/104* | (2014.01) |
| *C09D 11/106* | (2014.01) |
| *C09D 11/324* | (2014.01) |
| *B33Y 10/00* | (2015.01) |
| *B33Y 70/00* | (2015.01) |
| *B41M 7/00* | (2006.01) |

(52) U.S. Cl.
CPC ................ *B33Y 80/00* (2014.12); *B41J 2/01* (2013.01); *C08F 283/02* (2013.01); *C08J 7/047* (2013.01); *C09D 11/101* (2013.01); *C09D 11/104* (2013.01); *C09D 11/106* (2013.01); *C09D 11/324* (2013.01); *C09D 167/00* (2013.01); *B33Y 10/00* (2014.12); *B33Y 70/00* (2014.12); *B41M 7/0081* (2013.01); *C08J 2367/02* (2013.01); *C08J 2433/10* (2013.01)

(58) Field of Classification Search
CPC ..... B41M 3/008; B41M 5/0023; B33Y 30/00; B33Y 80/00; B33Y 10/00; B33Y 70/10; C08J 7/047; C08J 2367/02; C08J 2433/10; C09D 167/00
USPC .................................................. 522/1; 520/1
See application file for complete search history.

(56) References Cited

U.S. PATENT DOCUMENTS

| | | | |
|---|---|---|---|
| 8,632,174 B2 | 1/2014 | Noguchi et al. | |
| 8,727,522 B2 | 5/2014 | Maekawa et al. | |
| 8,815,140 B2 | 8/2014 | Aruga et al. | |
| 8,926,082 B2 | 1/2015 | Hiraoka | |
| 8,926,083 B2 | 1/2015 | Hiraoka | |
| 8,926,084 B2 | 1/2015 | Hiraoka | |
| 9,068,094 B2 | 6/2015 | Hiraoka | |
| 9,120,946 B2 | 9/2015 | Seno et al. | |
| 2004/0145639 A1 | 7/2004 | Noutary | |
| 2012/0147103 A1 | 6/2012 | Hasegawa et al. | |
| 2012/0200648 A1* | 8/2012 | Hiraoka | C09D 11/101 347/86 |
| 2012/0242768 A1 | 9/2012 | Seno et al. | |
| 2013/0321539 A1* | 12/2013 | Hiraoka | C09D 11/30 347/86 |
| 2014/0240414 A1 | 8/2014 | Hiraoka | |
| 2014/0327719 A1 | 11/2014 | Hiraoka | |
| 2014/0336298 A1 | 11/2014 | Hiraoka | |
| 2014/0338562 A1 | 11/2014 | Hiraoka | |
| 2014/0370214 A1* | 12/2014 | Araki | B41M 5/0029 428/35.7 |
| 2015/0009265 A1 | 1/2015 | Kohzuki et al. | |
| 2015/0042731 A1 | 2/2015 | Hiraoka | |
| 2015/0077481 A1 | 3/2015 | Yoshino et al. | |
| 2015/0099819 A1 | 4/2015 | Hiraoka | |

(Continued)

FOREIGN PATENT DOCUMENTS

| | | |
|---|---|---|
| JP | 07-010894 | 2/1995 |
| JP | 2004-526820 | 9/2004 |

(Continued)

OTHER PUBLICATIONS

U.S. Appl. No. 14/837,423, filed Aug. 27, 2015.

(Continued)

*Primary Examiner* — Jessica Whiteley
(74) *Attorney, Agent, or Firm* — Oblon, McClelland, Maier & Neustadt, L.L.P.

(57) ABSTRACT

An active-energy-ray-curable composition including at least one monofunctional (meth)acrylate, at least one multifunctional (meth)acrylate, and at least one polyester-structure-containing polymer. Preferable is an aspect where the active-energy-ray-curable composition further includes a polymer obtained through polymerization of at least one selected from the group consisting of styrene, styrene derivatives, acrylic acid esters, and acrylic acid.

19 Claims, 4 Drawing Sheets

(56) References Cited

U.S. PATENT DOCUMENTS

| | | | |
|---|---|---|---|
| 2015/0126636 A1 | 5/2015 | Hiraoka | |
| 2015/0130878 A1 | 5/2015 | Kohzuki et al. | |
| 2015/0232675 A1 | 8/2015 | Yoshino et al. | |
| 2015/0232676 A1 | 8/2015 | Hiraoka | |
| 2015/0232677 A1 | 8/2015 | Hiraoka | |
| 2015/0329729 A1 | 11/2015 | Hiraoka | |
| 2016/0009931 A1 | 1/2016 | Kohzuki et al. | |
| 2016/0075895 A1 | 3/2016 | Kohzuki et al. | |
| 2016/0347961 A1* | 12/2016 | Kobayashi ........... | C09D 133/26 |
| 2017/0022378 A1* | 1/2017 | Iio ............................ | C09D 4/06 |
| 2018/0147776 A1* | 5/2018 | Kotani ................... | B33Y 10/00 |

FOREIGN PATENT DOCUMENTS

| | | |
|---|---|---|
| JP | 2009-209316 | 9/2009 |
| JP | 2010-202684 | 9/2010 |
| JP | 2011-144288 | 7/2011 |
| JP | 2012-251123 | 12/2012 |
| JP | 2013-79383 | 5/2013 |
| JP | 2013-249357 | 12/2013 |
| JP | 2016-011416 | 1/2016 |
| WO | WO2015/186340 A1 | 12/2015 |

OTHER PUBLICATIONS

Communication dated Dec. 25, 2018, in Japanese Patent Application No. 2016-001309 filed Jan. 6, 2016 w/English translation.

\* cited by examiner

ACTIVE-ENERGY-RAY-CURABLE COMPOSITION, COMPOSITION STORED CONTAINER, TWO-DIMENSIONAL OR THREE-DIMENSIONAL IMAGE FORMING APPARATUS, METHOD FOR FORMING TWO-DIMENSIONAL OR THREE-DIMENSIONAL IMAGE, AND CURED PRODUCT

CROSS-REFERENCE TO RELATED APPLICATIONS

The present application claims priority under 35 U.S.C. § 119 to Japanese Patent Application No. 2015-136642, filed Jul. 8, 2015 and Japanese Patent Application No. 2016-001309, filed Jan. 6, 2016. The contents of which are incorporated herein by reference in their entirety.

BACKGROUND OF THE INVENTION

Field of the Invention

The present disclosure relates to active-energy-ray-curable compositions, composition stored containers, two-dimensional or three-dimensional image forming apparatuses, methods for forming two-dimensional or three-dimensional images, and cured products.

Description of the Related Art

Active-energy-ray-curable inkjet inks containing (meth) acrylic acid esters are widely known (see Japanese Translation of PCT International Application Publication No. JP-T-2004-526820). In addition, it is known that incorporation of polymer components in a black ink composition containing polymerizable compounds can impart various functions to coated films (see Japanese Examined Patent Publication No. 07-10894).

One advantage of incorporating polymer components is that sufficient close adhesiveness can be ensured to, for example, substrates made of plastic materials being difficult for liquid to permeate, relatively having a smooth surface, and being unable to successfully retain close adhesiveness to coating films.

SUMMARY OF THE INVENTION

As means for solving the problems, an active-energy-ray-curable composition of the present disclosure contains at least one monofunctional (meth)acrylate, at least one multifunctional (meth)acrylate, and at least one polyester-structure-containing polymer.

DESCRIPTION OF THE EMBODIMENTS

Figure 1:
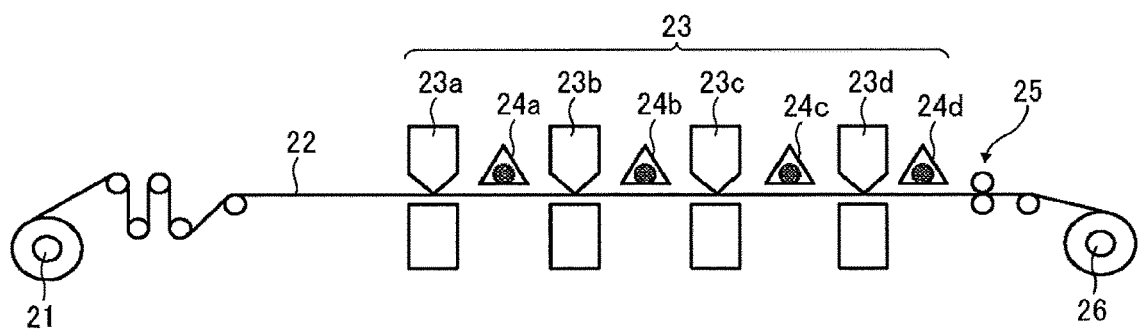
FIG. 1 is a schematic view of an example of an image forming apparatus of the present disclosure.

The present disclosure has an object to provide an active-energy-ray-curable composition having low viscosity in such a degree that the resultant ink can be ejected through inkjet, being not problematic in skin sensitization, and being excellent in close adhesiveness to polyethylene terephthalate substrates that are not surface-treated.

According to the present disclosure, it is possible to provide an active-energy-ray-curable composition having low viscosity in such a degree that the resultant ink can be ejected through inkjet, being not problematic in skin sensitization, and being excellent in close adhesiveness to polyethylene terephthalate substrates that are not surface-treated.

(Active-Energy-Ray-Curable Composition)

An active-energy-ray-curable composition of the present disclosure contains at least one monofunctional (meth)acrylate, at least one multifunctional (meth)acrylate, and at least one polyester-structure-containing polymer, and further contains other components if necessary.

The present disclosure is based on the following findings. Specifically, when a typical active-energy-ray-curable ink contains polymer components, a viscosity of the active-energy-ray-curable ink increases considerably due to the polymer components. Therefore, when a component of the photopolymerizable inkjet ink (i.e., a monomer) to be a base component does not have sufficiently low viscosity, it is difficult to lower a viscosity of the active-energy-ray-curable ink containing the polymer components in such a degree that the resultant ink can be ejected. In addition, the substrates having poor adhesiveness (e.g., polyethylene terephthalate substrates) are generally subjected to surface treatment such as the corona-discharge surface treatment. However, these surface treatments may be difficult to conduct under the restricted conditions of devices and workplaces. Therefore, it is desired to ensure close adhesiveness to substrates having poor adhesiveness (e.g., polyethylene terephthalate) that are not surface-treated.

In addition, most of the monomer materials used in the active-energy-ray-curable inkjet inks have toxicity. In particular, (meth)acrylic acid esters that are inexpensive and are easily available have sufficiently low viscosity, but are positive in skin sensitization causing allergy when the monomer materials are touched to the skin. Under such circumstances, for example, it seems that users may wear the protective clothes when using such inks. However, it is desired to obtain an active-energy-ray-curable inkjet ink being not problematic in skin sensitization, and having sufficiently low viscosity in such a degree that the ink can be ejected at room temperature even if it contains polymer components.

Note that, a low viscosity of the active-energy-ray-curable composition can be easily achieved by containing a dilution solvent. However, considering the environmental effect, it is not preferable that solvents be released into the atmosphere through volatilization. Therefore, incorporation of the solvent in the ink should be avoided. In addition, a low viscosity of the active-energy-ray-curable composition can be achieved by containing a water-soluble monomer and a dilution solvent in the active-energy-ray-curable composition. However, an effect on permeation drying on substrates having poor adhesiveness (e.g., plastic substrates) cannot be ensured. Therefore, water in the ink needs to be volatilized through drying in order to perform high-speed printing process, and thus a heat source typically needs to be disposed in a device, which is not preferable in terms of energy saving.

<Monofunctional (Meth)Acrylate>

A sufficiently low viscosity of an ultraviolet (UV)-ray-polymerizable composition (including electron-beams (EB)-polymerizable-compositions produced through irradiation of higher energy) can be retained even if the composition contains the monofunctional (meth)acrylate in combination with the polymer components.

Examples of the monofunctional (meth)acrylate include t-butyl (meth)acrylate, n-pentyl (meth)acrylate, n-hexyl (meth)acrylate, γ-butyrolactone (meth)acrylate, isobornyl (meth)acrylate, formalized trimethylolpropane mono(meth)acrylate, trimethylolpropane (meth)acrylic acid benzoic acid ester, and (meth)acryloyl morpholine. These may be used alone or in combination. Among them, t-butyl methacrylate, n-pentyl methacrylate, and n-hexyl methacrylate are preferable because these compounds are negative in skin sensitization.

An amount of the monofunctional (meth)acrylate is preferably 50 parts by mass or more but 85 parts by mass or less relative to 100 parts by mass of a total of the monofunctional (meth)acrylate and the multifunctional (meth)acrylate. When the amount of the monofunctional (meth)acrylate is 50 parts by mass or more but 85 parts by mass or less, a viscosity of the active-energy-ray-curable composition can be lowered.

<Multifunctional (Meth)Acrylate>

The multifunctional (meth)acrylate is a compound having two or more methacryloyl groups or acryloyl groups in a molecule of the multifunctional (meth)acrylate, and is preferably a compound having two or more but six or less methacryloyl groups or acryloyl groups.

Examples of the multifunctional (meth)acrylate include glycerol di(meth)acrylate, ethyleneoxide-modified trimethylolpropane tri(meth)acrylate, caprolactone-modified dipentaerythritol hexa(meth)acrylate, tricyclodecane dimethanol di(meth)acrylate, ethylene glycol di(meth)acrylate, hydroxy pivalic acid neopentyl glycol di(meth)acrylate, polytetramethylene glycol di(meth)acrylate, diethylene glycol di(meth) acrylate, triethylene glycol di(meth)acrylate, tetraethylene glycol di(meth)acrylate, polyethylene glycol diacrylate [$CH_2$=CH—CO—($OC_2H_4$)$_n$—OCOCH=$CH_2$ (n is nearly equal to 9), $CH_2$=CH—CO—($OC_2H_4$)$_n$—OCOCH=$CH_2$ (n is nearly equal to 14), $CH_2$=CH—CO—($OC_2H_4$)$_n$—OCOCH=$CH_2$ (n is nearly equal to 23)], dipropylene glycol di(meth)acrylate, tripropylene glycol di(meth)acrylate, polypropylene glycol dimethacrylate [$CH_2$=C($CH_3$)—CO—($OC_3H_6$)$_n$—OCOC($CH_3$)=$CH_2$ (n is nearly equal to 7)], 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, tricyclodecane dimethanoldiacrylate, propylene oxide-modified bisphenol A di(meth)acrylate, polyethylene glycol dimethacrylate represented by the following formula, dipentaerythritol hexa(meth)acrylate, 2-hydroxypropyl (meth)acrylamide, propylene oxide-modified tetramethylolmethane tetra (meth)acrylate, dipentaerythritol hydroxypenta(meth)acrylate, caprolactone-modified dipentaerythritol hydroxypenta(meth)acrylate, ditrimethylolpropane tetra(meth)acrylate, pentaerythritol tetra(meth)acrylate, trimethylolpropane tri(meth)acrylate, ethyleneoxide-modified trimethylolpropane triacrylate, propylene oxide-modified trimethylolpropane tri(meth)acrylate, caprolactone-modified trimethylolpropane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentyl glycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, polyurethane di(meth)acrylate, polyurethane tri(meth)acrylate, polyurethane tetra(meth)acrylate, polyurethane penta(meth)acrylate, and polyurethane poly(meth)acrylate. These may be used alone or in combination. Among them, glycerol dimethacrylate, ethyleneoxide-modified trimethylolpropane trimethacrylate, caprolactone-modified dipentaerythritol hexaacrylate, tricyclodecane dimethanol dimethacrylate, and polyethylene glycol dimethacrylate represented by the following formula are preferable because these compounds are negative in skin sensitization.

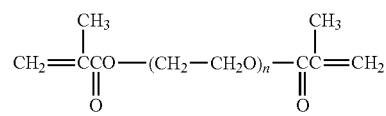

(In the formula, n is in a range of from 2 through 23.)

In the formula, n is preferably 2, 3, 4, 9, 14, and 23, more preferably 2, 9, and 14.

An amount of the multifunctional (meth)acrylate is preferably 15 parts by mass or more but 50 parts by mass or less relative to 100 parts by mass of a total of the monofunctional (meth)acrylate and the multifunctional (meth)acrylate. When the amount of the multifunctional (meth)acrylate is 15 parts by mass or more but 50 parts by mass or less, the active-energy-ray-curable composition can be improved in curing ability.

The monofunctional (meth)acrylates (e.g., the t-butyl methacrylate, the n-pentyl methacrylate, and the n-hexyl methacrylate) have such a low viscosity that is about 1 mPa·s or more but about 2 mPa·s or less at 25° C. Therefore, a viscosity of the thus-obtained active-energy-ray-curable composition can be lowered in such a degree that the ink can be ejected through inkjeting without causing problems in skin sensitization.

A vapor pressure of the monofunctional (meth)acrylate is as follows. Specifically, the t-butyl methacrylate has a vapor pressure of 700 Pa (18.5° C.), the n-pentyl methacrylate has a vapor pressure of 69.1 Pa (25° C.), and the n-hexyl methacrylate has a vapor pressure of 34.7 Pa (20° C.). These monofunctional (meth)acrylates have a higher vapor pressure than benzyl acrylate (positive in skin sensitization) that is a common photopolymerizable monomer having low viscosity (9.7 Pa at 25° C.), which tends to be disadvantageous in drying ability. Incorporation of the multifunctional (meth)acrylate and the monofunctional (meth)acrylate having a low viscosity into the resultant ink probably causes volatilization near nozzles.

When the monofunctional (meth)acrylate is used in combination with at least one multifunctional (meth)acrylate selected from glycerol dimethacrylate, ethyleneoxide-modified trimethylolpropane trimethacrylate, caprolactone-modified dipentaerythritol hexaacrylate, tricyclodecane dimethanol dimethacrylate, and polyethylene glycol dimethacrylate represented by the aforementioned formula, the active-energy-ray-curable composition can be further improved in curing ability.

The active-energy-ray-curable composition of the present disclosure may further contain other polymer compounds other than the monofunctional (meth)acrylate and the multifunctional (meth)acrylate.

Examples of the other polymer compounds include vinyl ethers.

Examples of the vinyl ethers include N-vinylcaprolactam, N-vinylpyrrolidone, N-vinylformamide, triethylene glycol divinyl ether, cyclohexane dimethanoldivinyl ether, cyclohexane dimethanol monovinyl ether, hydroxyethylvinyl ether, diethylene glycol monovinyl ether, diethylene glycol divinyl ether, dicyclopentadiene vinyl ether, tricyclodecane vinyl ether, benzyl vinyl ether, ethyloxetane methyl vinyl ether, triethylene glycol divinyl ether, hydroxybutyl vinyl ether, and ethyl vinyl ether. These may be used alone or in combination.

[Skin Sensitization]

A polymerized compound negative in skin sensitization means a compound satisfying at least one of the following (1) to (3).
(1) A compound having a Stimulation Index of less than 3, where the Stimulation Index (SI value) indicates a degree of skin sensitization as measured by the skin sensitization test according to LLNA method: Local Lymph Node Assay.
(2) A compound evaluated as "compound negative in skin sensitization" or "compound having no skin sensitization" by the Material Safety Data Sheet (MSDS).
(3) A compound evaluated as "compound negative in skin sensitization" or "compound having no skin sensitization" in the reference (e.g., *Contact Dermatitis* 8, 223-235 (1982))

In the (1), it is judged that a compound is negative in skin sensitization when the SI value of the compound is less than 3, as described in the journal of "*Function and Materials*", September, 2005, volume 25, No. 9, on page 55. The lower the SI value is, the lower skin sensitization is.

In the (2), a compound evaluated as "compound negative in skin sensitization" or "compound having no skin sensitization" means that the SI value of the compound is less than 3.

The monofunctional (meth)acrylate and the multifunctional (meth)acrylate preferably have low Stimulation Index (SI value), which indicates a degree of skin sensitization measured by the skin sensitization test (LLNA method). The monofunctional (meth)acrylate and the multifunctional (meth)acrylate more preferably have less than 3 of the Stimulation Index, still more preferably have 2 or less of the Stimulation Index, particularly preferably have 1.6 or less of the Stimulation Index.

<Polyester-Structure-Containing Polymer>

The polyester-structure-containing polymer can allow the active-energy-ray-curable composition to have favorable curing ability and excellent close adhesiveness to a polyethylene terephthalate substrate that is not surface-treated.

The polyester-structure-containing polymer is not particularly limited and may be appropriately selected depending on the intended purpose so long as it is favorably dissolved in both the monofunctional (meth)acrylate and the multifunctional (meth)acrylate.

Examples of the polyester-structure-containing polymer include (meth)acryl-modified polyester resins containing a polyester portion in a main chain thereof, modified polyester resins containing a polyester portion in a side chain thereof, styrene-modified polyester resins containing a polyester structure in a main chain thereof, styrene-modified polyester resins containing a polyester portion in a side chain thereof, and polyester-modified silicone resins. Specific examples of the polyester-structure-containing polymer include copolymers obtained by reacting (meth)acrylic monomer with an unsaturated dicarboxylic acid (e.g., maleate and fumarate); copolymers obtained by reacting an unsaturated dicarboxylic acid with a (meth)acrylic monomer obtained by substituting hydrogen atoms positioned at both sides of OH groups of bisphenol A with (meth)acryloyl groups; and modified polyester resins (or polyester-modified acrylic resins) obtained through polymerization of modified (meth)acrylic monomers of which side chain includes a polyester portion formed by condensing oxocarboxylic acids. Note that, most of the pure polyester-structure-containing polymers are not dissolved in the monofunctional (meth)acrylate and the multifunctional (meth)acrylate.

The polyester-structure-containing polymer preferably contains a hydroxyl group.

Commercially available products of the polyester-structure-containing polymer may be used. Examples of the commercially available products include product name: VYLON 802 (available from TOYOBO CO., LTD., number average molecular weight: 3,000, hydroxyl value: 37 mg KOH/g, acid value: less than 1 mg KOH/g); product name: VYLON GK810 (available from TOYOBO CO., LTD., average molecular weight: 6,000, hydroxyl value: 19 mg KOH/g, acid value: 5 mg KOH/g); and product name: VYLON 650 (available from TOYOBO CO., LTD., hydroxyl value: 5 mg KOH/g, acid value: less than 2 mg KOH/g, number average molecular weight: 23,000). These may be used alone or in combination.

A condition that the polyester-structure-containing polymer is dissolved in the monofunctional (meth)acrylate and the multifunctional (meth)acrylate depends on a weight average molecular weight, conformation, and configuration of the polyester-structure-containing polymer. An amount of the polyester portions in the polyester-structure-containing polymer is preferably 50% by mass or less, more preferably 30% by mass or less relative to the total amount of the polyester-structure-containing polymer. In the field of coating, it is known that two or more mixed solvents having different solubilities are used to form the so-called O/O emulsion. However, it is considerably difficult to achieve the object of the present disclosure by applying this technique in order that a viscosity of the active-energy-ray-curable composition is lowered for curing.

It is preferable that the polyester-structure-containing polymer have favorable ability to be dissolved in the monofunctional (meth)acrylate and the multifunctional (meth)acrylate. Thus, the polyester-structure-containing polymer having a cross-linked structure is not suitable for use. The polyester-structure-containing polymer having a chain structure is preferable. The polyester-structure-containing polymer having a high average molecular weight is considerably poor in ability to be dissolved in the ink, even if it has a chain structure, which is not preferable. A weight average molecular weight of the polyester-structure-containing polymer is 100,000 or less, more preferably 50,000 or less, and preferably 1,000 or more. A number average molecular weight of the polyester-structure-containing polymer is preferably 10,000 or less. Furthermore, in order to obtain favorable dissolubility, it is important that the polyester-structure-containing polymer has neither rigidity nor high crystallinity, and can be inexpensively and easily available for practical use. In addition, the polyester-structure-containing polymers having any acid values or any hydroxyl values can be used depending on dissolubility and other conditions.

Here, the weight average molecular weight and the number average molecular weight are a weight average molecular weight and a number average molecular weight, which are determined according to the standard polystyrene molecular weight conversion, and are measured by using the following: a high-speed liquid chromatography apparatus ("WATERS 2695" (main body), available from Waters) with a detector ("WATERS 2414", available from Waters); and a column (SHODEX GPC KF-806L (molecular cut-off: $2\times10^7$, separation range: 100 through $2\times10^7$, theoretical plate: 10,000 steps/column, filler material: styrene divinylbenzene copolymer, particle diameter of the filler: 10 μm) so that the three columns are arranged in series.

A glass transition temperature of the polyester-structure-containing polymer is preferably 30° C. or more, more preferably 50° C. or more. When the glass transition temperature of the polyester-structure-containing polymer is 30° C. or more, the polyester-structure-containing polymer can retain a state at a temperature equal to or higher than the glass transition temperature under the common room temperature environments, which is suitable for retaining strength of the coated film.

The polyester-structure-containing polymer is precipitated when the active-energy-ray-curable composition is added dropwise to a solvent (e.g., methanol), and can be isolated by filtrating the composition dissolved in the solvent. When the precipitated product is analyzed by infrared spectroscopy, absorption peak originated from an ester bond can be confirmed at about 1,700 $cm^{-1}$. The other components can be confirmed for whether the other components are identical to the intended other components by gas chromatography mass spectrometry.

An amount of the polyester-structure-containing polymer is preferably 10 parts by mass or more but 20 parts by mass or less relative to 100 parts by mass of a total of the monofunctional (meth)acrylate and the multifunctional (meth)acrylate.

<Other Polymers>

The other polymers are obtained through polymerization of at least one selected from the group consisting of styrene, styrene derivatives, acrylic acid esters, and acrylic acid.

Examples of the other polymers include homopolymers and copolymers.

Incorporation of the other polymers makes it possible to further favorably retain close adhesiveness even if an image or a cured product formed on an impermeable substrate (e.g., plastic materials, metals, and glasses) is immersed in water, which leads to improvement in water resistance.

The other polymers preferably contain a hydroxyl group.

A glass transition temperature of the other polymers is preferably 30° C. or more, more preferably 50° C. or more. When the glass transition temperature of the other polymers is more than 30° C. or more, the other polymers can retain a state at a temperature equal to or higher than the glass transition temperature under the common room temperature environments, which is suitable for retaining strength of the coated film.

A weight average molecular weight of the other polymers is preferably 1,000 or more but 100,000 or less, more preferably 1,000 or more but 50,000 or less.

The other polymers are appropriately synthesized and may be commercially available products.

Examples of the commercially available products include: product name: JONCRYL 611 (styrene-acryl resin, available from BASF, acid value: 53 mg KOH/g, glass transition temperature: 50° C.); product name: JONCRYL 804 (acrylic resin, available from BASF, acid value: 15 mg KOH/g, glass transition temperature: 70° C.); product name: HIMER ST-95 (low-molecular-weight polystyrene resin, available from Sanyo Chemical Industries, Ltd., acid value: 0 mg KOH/g, glass transition temperature: 42° C.); product name: ARUFON (Registered Trademark) UC-3000 (solid) (acrylic resin, available from Toagosei Company, Limited, acid value: 74 mg KOH/g, glass transition temperature: 65° C.); and product name: VS-1063, polystyrene resin, SEIKO PMC CORPORATION, acid value: 0 mg KOH/g, glass transition temperature: 100° C.). These may be used alone or in combination.

<Polymerization Initiator>

It is preferable that the active-energy-ray-curable composition of the present disclosure further contain a polymerization initiator.

Examples of the polymerization initiator include photoradical polymerization initiators. Among them, photoradical polymerization initiators negative in skin sensitization are preferable.

Examples of the photoradical polymerization initiators include self-cleaving photopolymerization initiators and hydrogen-abstracting photopolymerization initiators.

Examples of the self-cleaving photopolymerization initiators include 2,2-dimethoxy-1,2-diphenylethan-1-one, 1-hydroxycyclohexyl phenylketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methylpropionyl)benzyl]phenyl}-2-methyl-1-propan-1-one, phenylglyoxylic acid methyl ester, 2-methyl-1-[4-(methylthio)phenyl]-2-morpholinopropan-1-one, 2-benzyl-2-dimethylamino-1-(4-morpholinophenyl)butanone-1, 2-dimethylamino-2-(4-methylbenzyl)-1-(4-morpholin-4-yl-phenyl)butan-1-one, 2-(dimethylamino)-2-(4-methylbenzyl)-1-(4-morpholinophenyl)butan-1-one, bis(2,4,6-trimethylbenzoyl)phenylphosphine oxide, bis(2,6-dimethoxybenzoyl)-2,4,4-trimethyl-pentylphosphine oxide, 2,4,6-trimethylbenzoylphosphine oxide, 1,2-octanedion-[4-(phenylthio)-2-(o-benzoyloxime)], ethanone-1-[9-ethyl-6-(2-methylbenzoyl)-9H-carbazol-3-yl]-1-(O-acetyloxime), [4-(methylphenylthio)phenyl]phenylmethanone, and 2-[4-(methylthio)benzoyl]-2-(4-morpholinyl)propane. These may be used alone or in combination.

Examples of the hydrogen-abstracting photopolymerization initiators include: benzophenone compounds such as benzophenone, methylbenzophenone, methyl-2-benzoylbenzoate, 4-benzoyl-4'-methyldiphenyl sulfide, and phenylbenzophenone; and thioxanthone compounds such as 2,4-diethylthioxanthone, 2-chlorothioxanthone, isopropylthioxanthone, and 1-chloro-4-propylthioxanthone. These may be used alone or in combination.

Among them, 1-hydroxycyclohexyl phenyl ketone, 2-dimethylamino-2-(4-methylbenzyl)-1-(4-morpholin-4-yl-phenyl)butan-1-one, and an equimolar mixture of 2,4-diethylthioxanthone and 2-ethylhexyl p-dimethylaminobenzoic acid are preferable because they are negative in skin sensitization, and are inexpensively and easily available polymerization initiators.

The polymerization initiators may be commercially available products. Examples of the commercially available products include: product name: IRGACURE 184; product name: IRGACURE 379; and product name: IRGACURE 907 (all of the products are available from BASF). These may be used alone or in combination.

It is known that (meth)acrylic acid esters, (meth)acrylamides, derivatives of the (meth)acrylic acid esters or the (meth)acrylamides, and vinyl ethers undergo ion polymerization. However, ion polymerization initiators are typically expensive, and slightly generate strong acid and strong alkali even under conditions that no light is emitted. Therefore, an ink supplying path of an inkjet coating system necessarily has special configuration, for example, to endure acid and alkali. Accordingly, there may be constraints on choice of members constituting the inkjet coating system. Meanwhile, the photoradical polymerization initiator that is inexpensive and does not generate strong acid and strong alkaline can be used for the active-energy-ray-curable composition of the present disclosure. Therefore, the thus-obtained ink can be inexpensively produced, and choice of the members constituting the inkjet coating system is easily made. In cases where a light source having high energy (e.g., electron beams, β-rays, X-rays, α-rays, and γ-rays) is used, polymerization reaction can proceed without using the polymerization initiator. However, this is typically known hitherto, and will not be described in details in the present disclosure.

An amount of the polymerization initiator is preferably 5 parts by mass or more but 15 parts by mass or less relative to 100 parts by mass of a total of the monofunctional (meth)acrylate and the multifunctional (meth)acrylate. When the amount of the monofunctional (meth)acrylate is 5 parts by mass or more but 15 parts by mass or less, the active-energy-ray-curable composition can be improved in curing ability.

<Polymerization Inhibitor>

Near nozzles of an inkjet ejecting device, polymerization reaction easily proceeds due to an increase in the ejection temperature, an increase in the temperature of an UV lamp, or light leakage. Moreover, the monomer having low viscosity may volatilize, and an increase in density of the polymerization initiator through volatilization may accelerate polymerization reaction. In cases where the ink contains the polyester-structure-containing polymer, adhesiveness of the ink may occur during polymerization reaction. As a result, the ink droplets are adhered to nozzles, and deflection of the ink easily occurs. These problems may not be solved even if a prescribed recovery process is performed. Therefore, incorporation of the polymerization inhibitor can prevent the ink from polymerization reaction even if the monomer having low viscosity volatilizes, which results in improvement in ejection reliability.

The polymerization inhibitor includes two hydroxyl groups in a molecule of the polymerization inhibitor. When the polymerization inhibitor includes two hydroxyl groups in the molecule, the resultant active-energy-ray-curable composition can be excellent in ability to recover ejection compared with a polymerization inhibitor including one hydroxyl group in a molecule of the polymerization inhibitor.

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di(α-methylcyclohexyl)-5,5'-dimethyl diphenylmethane, p-benzoquinone, di-t-butyldiphenylamine, 9,10-di-n-butoxyanthracene, and 4,4'-[1,10-dioxo-1,10-decanediylbis(oxy)]bis[2,2,6,6-tetramethyl]-1-piperidinyloxy. These may be used alone or in combination.

Commercially available products of the polymerization inhibitor may be used. Examples of the commercially available products include: product name: methoquinone (4-methoxyphenol, available from Seiko Chemical Co., Ltd); product name: MNT (4-methoxy-1-naphthol, available from Kawasaki Kasei Chemicals Ltd.); product name: hydroquinone (p-hydroxyphenol, available from Seiko Chemical Co., Ltd); product name: MH (methylhydroquinone, available from Seiko Chemical Co., Ltd); and product name: NONFLEX ALBA (2,5-di-tert-butylhydroquinone, available from Seiko Chemical Co., Ltd). These may be used alone or in combination.

An amount of the polymerization inhibitor is 0.01×A % by mass or more when an amount of the polymerization initiator is defined as A % by mass.

<Polymerization Promoter>

The active-energy-ray-curable composition of the present disclosure can contain a polymerization promoter.

Examples of the polymerization promoter include amines.

Examples of the amines include ethyl p-dimethyl aminobenzoate, p-dimethylaminobenzoic acid-2-ethyl hexyl, methyl p-dimethylamino benzoate, benzoic acid-2-dimethyl aminoethyl, and butoxyethyl p-dimethyl aminobenzoate.

<Colorant>

The composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% by mass to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxazine pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

Examples of the other components include higher fatty acid esters containing a polyether group, an amino group, a carboxyl group, and a hydroxyl group; polydimethylsiloxane compounds containing a polyether group, an amino group, a carboxyl group, and a hydroxyl group at a side chain or a terminal chain of the polydimethylsiloxane compound; surfactants such as fluoroalkyl compounds containing polyether, an amino group, a carboxyl group, and a hydroxyl group; and high-molecular-pigment-dispersing agents containing a polar group.

<Preparation of Active-Energy-Ray-Curable Composition>

The active-energy-ray-curable composition of the present disclosure can be prepared by using the components described above. The preparation devices and conditions are not particularly limited. For example, the curable—composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, and a surfactant.

<Active Energy Rays>

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, ß-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Viscosity>

A viscosity of the active-energy-ray-curable composition of the present disclosure is not particularly limited so long as the viscosity can be appropriately adjusted depending on the purpose and application devices. For example, when an ejecting unit configured to eject the composition from nozzles is employed, the viscosity of the active-energy-ray-curable composition is preferably 5 mPa·s or more but 18 mPa·s or less in the temperature range of 20° C. to 65° C., preferably at 25° C. In addition, it is more preferable that the active-energy-ray-curable composition satisfy the aforementioned range of the viscosity without containing the organic solvent. Incidentally, the viscosity can be measured by a cone plate rotary viscometer (VISCOMETER TVE-22L, available from TOKI SANGYO CO., LTD.) using a cone rotor (1°34'×R24) under the following conditions: number of revolutions: 50 rpm, temperature of thermostatic circulating water: from 20° C. through 65° C. Here, VISCO-MATE VM-150III is used to adjust temperature of the circulating water. VISCOMATE VM-150III can be used for adjusting the temperature of the circulating water.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Figure 2:
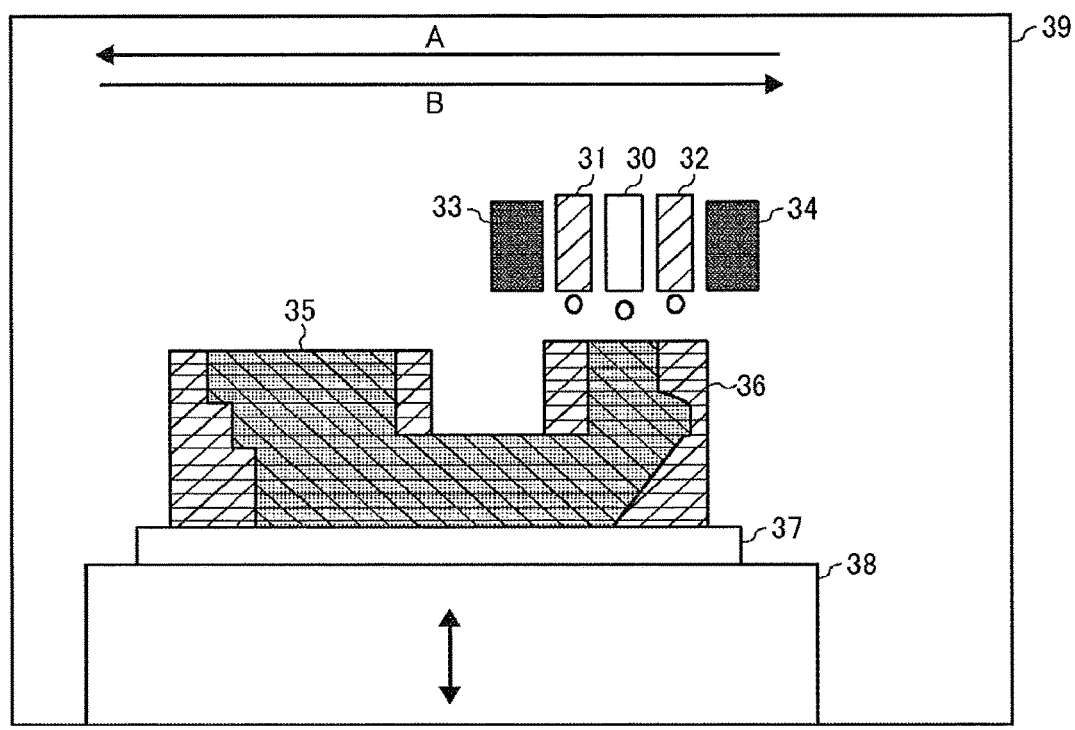
FIG. 2 is a schematic view of an example of another image forming apparatus of the present disclosure.
Figure 3A:
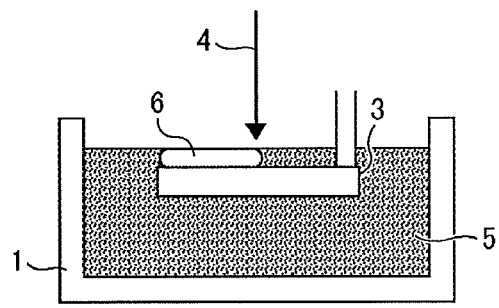
FIG. 3A is a schematic view of an example of still another image forming apparatus of the present disclosure.
Figure 3B:
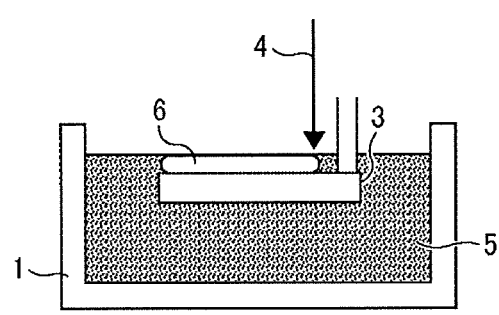
FIG. 3B is a schematic view of an example of still another image forming apparatus of the present disclosure.
Figure 3C:
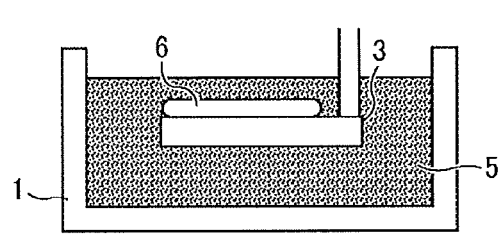
FIG. 3C is a schematic view of an example of still another image forming apparatus of the present disclosure.
Figure 3D:
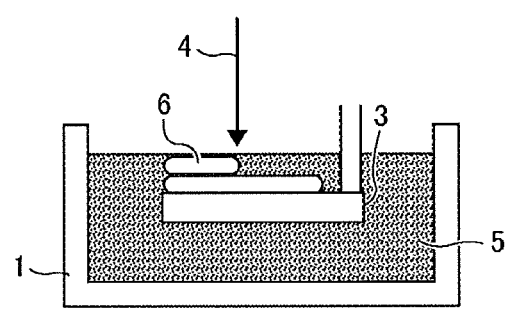
FIG. 3D is a schematic view of an example of still another image forming apparatus of the present disclosure.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers, and as a three-dimensional object constituent material (a model material) and a supporting member used in an additive manufacturing method (a stereolithography method) as illustrated in FIG. 2, FIG. 3A, FIG. 3B, FIG. 3C, and FIG. 3D. FIG. 2 is a diagram illustrating a method of additive manufacturing to sequentially form layers of the active-energy-ray-curable composition of the present disclosure one on top of the other by repeating discharging the curable composition to particular areas followed by curing upon irradiation of an active energy ray (details will be described hereinafter). FIGS. 3A to 3D are each a diagram illustrating a method of additive manufacturing to sequentially form cured layers 6 having respective predetermined forms one on top of the other on a movable stage 3 by irradiating a storing pool (storing part) 1 of the active energy ray curable composition 5 of the present disclosure with the active energy ray 4.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

An active-energy-ray-curable composition of the present disclosure is preferably an ink for inkjet.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle.

Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

Figure 4:
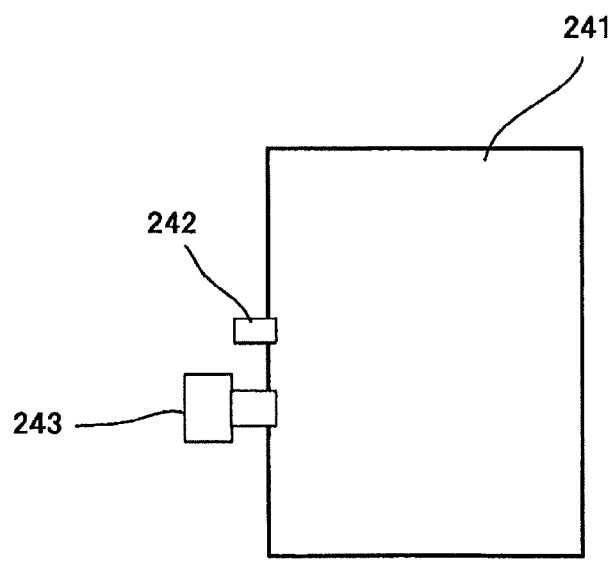
FIG. 4 is a schematic view of an example of a composition bag of a composition stored container.
Figure 5:
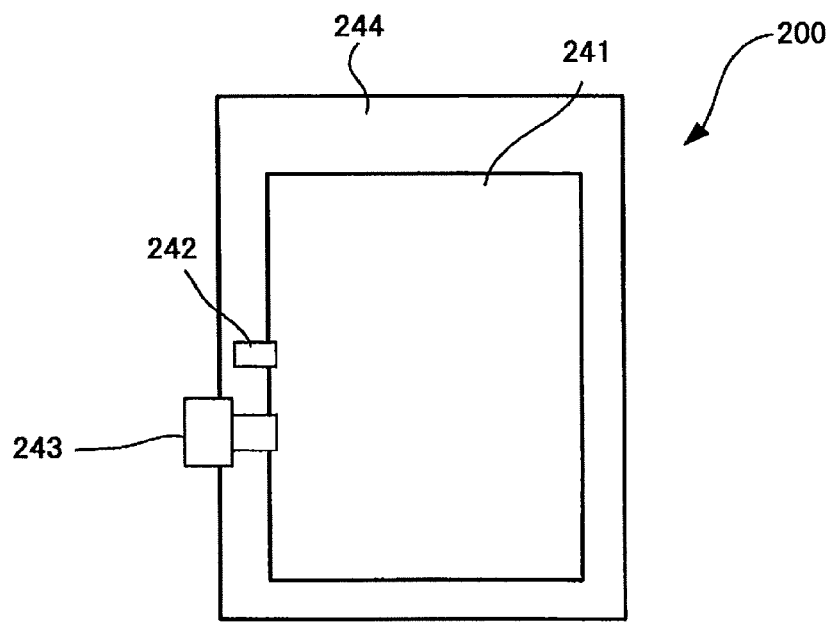
FIG. 5 is a schematic view of an example of a composition stored container storing the composition bag.

The above ink cartridge will be described with reference to FIG. 4 and FIG. 5. FIG. 4 is a schematic view of an example of an ink bag 241 of a composition stored container. FIG. 5 is a schematic view of an example of a composition stored container 200 storing the ink bag 241 of FIG. 4 in a cartridge case 244.

As illustrated in FIG. 4, an ink is inserted into the ink bag 241 from an ink inlet 242. After air remaining in the ink bag 241 is discharged from the ink bag 241, the ink bag 241 is closed by fusing the ink inlet 242. At the time of use, a needle attached to the main body of the device is sticked into an ink outlet 243 formed of a rubber member to supply the ink to the device. The ink bag 241 is formed of a wrapping member, such as an aluminium laminate film that cannot transmit air. As illustrated in FIG. 5, the ink bag 241 is typically housed in a plastic cartridge case 244, which serves as a composition stored container 200 and is detachably mounted on various inkjet coating devices.

A composition stored container of the present disclosure is preferably detachably mounted on an inkjet coating device. This configuration makes it possible to easily supply and replace an ink, and can be improved in workability.

<Image Forming Method and Image Forming Apparatus>

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration and/or a two-side printing configuration.

Optionally, multiple colors can be printed with no or weak active energy ray from the light sources 24a, 24b, and 24c followed by irradiation of the active energy ray from the light source 24d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms thin layers one on top of the other using a head unit having inkjet heads arranged movable in the directions indicated by the arrows A and B. In the image forming apparatus 39, an ejection head unit 30 for additive manufacturing ejects a first active-energy-ray-curable composition, and ejection head units 31 and 32 for support and curing these compositions ejects a second active-energy-ray-curable composition having a different composition from the first active-energy-ray-curable composition, while ultraviolet irradiators 33 and 34 adjacent to the ejection head units 31 and 32 cure the compositions. To be more specific, for example, after the ejection head units 31 and 32 for support eject the second active-energy-ray-curable composition onto a substrate 37 for additive manufacturing and the second active-energy-ray-curable composition is solidified by irradiation of an active energy ray to form a first substrate layer having a space for composition, the ejection head unit 30 for additive manufacturing ejects the first active-energy-ray-curable composition onto the pool followed by irradiation of an active energy ray for solidification, thereby forming a first additive manufacturing layer. This step is repeated multiple times lowering the stage 38 movable in the vertical direction to laminate the supporting layer and the additive manufacturing layer to fabricate a solid object 35. Thereafter, an additive manufacturing support 36 is removed, if desired. Although only a single ejection head unit 30 for additive manufacturing is provided to the image forming apparatus illustrated 39 in FIG. 2, it can have two or more units 30.

<Substrate>

Examples of the substrates include paper, plastics, metals, ceramics, glasses, and composite materials thereof. Permeable substrates (e.g., pure paper) favorably have effects on permeation drying, and thus aqueous inks having no quick drying property and solvent inks are practically used together with the permeable substrates. Meanwhile, inks having a quick drying property are practically used together with non-permeable substrates (e.g., matt coated paper, gloss coated paper, plastic films, plastic molded products, ceramics, glasses, and metals), and can be immediately cured through optical irradiation. Therefore, the non-permeable substrates are favorably used together with the active-energy-ray-curable composition of the present disclosure. Examples of the permeable substrates include polyethylene terephthalate substrates. The polyethylene terephthalate substrates may be subjected to the corona-discharge surface treatment so as to improve close adhesiveness by activating the surface of the substrate. However, such a treatment that generates electric sparks corresponds to a hazard according to the Fire Service Act, and cannot be generally employed in places where coatings are performed. However, the active-energy-ray-curable composition of the present disclosure can obtain sufficient close adhesiveness to the substrate even if the surface treatment (e.g., the corona-discharge surface treatment) is not performed.

(Cured Product)

A cured product of the present disclosure includes a substrate and a cured film disposed on the substrate, where the cured film is obtained on the substrate through curing by irradiating the active-energy-ray-curable composition of the present disclosure with active energy rays.

The substrate is preferably a polyethylene terephthalate substrate.

The cured film preferably includes at least one monofunctional (meth)acrylate, at least one multifunctional (meth)acrylate, and at least one polyester-structure-containing polymer.

The cured product has close adhesiveness of 1 kPa or more between the polyethylene terephthalate substrate and the cured film, more preferably has close adhesiveness of 10 kPa or more between the polyethylene terephthalate substrate and the cured film.

EXAMPLES

The present disclosure will be described by way of the following Examples. However, the present disclosure should not be construed as being limited to these Examples.

<Method for Evaluating SI Value>

The SI value was measured by a skin sensitization test by LLNA (Local Lymph Node Assay) method as described below.

[Test Materials]

<<Positive Control Substance>>

α-Hexyl cinnamaldehyde (HCA, available from Wako Pure Chemical Industries, Ltd.) was used as the positive control substance.

<<Medium>>

A mixture liquid obtained by mixing acetone (available from Wako Pure Chemical Industries, Ltd.) and an olive oil (available from Fujimi Pharmaceutical Co., Ltd.) at a volume ratio (acetone:olive oil) of 4:1 was used as the medium.

<<Animals Used>>

Female mice were subjected to eight days of conditioning to each of the test substance, the positive control, and the medium control including six days of quarantine. During the quarantine and conditioning period, nothing unusual was observed in any of the animals.

Based on the body weights of the animals measured two days before sensitization was started, the animals were divided into two groups (4 mice/group) in a manner that the body weight of each individual would be within ±20% of the average body weight of the whole group according to a body weight stratified random sampling method. The ages of the animals when sensitization was started were 8 weeks old or more but 9 weeks old or less. Any animals that did not fall into any group by the grouping were excluded from the test.

Throughout the test period, the animals used were identified with an oil-based ink applied to their tails, and their cages were identified with labels.

<<Breading Conditions>>

Throughout the whole breading period including the quarantine and conditioning period, the animals used were breaded in a barriered animal room set to the following conditions: temperature of 21° C. or more but 25° C. or less, relative humidity of 40% or more but 70% or less, air change rate of 10 changes/hour or more but 15 changes/hour or less, and light-dark cycle of 12 hour-intervals (light-on at 7 o'clock, and light-out at 19 o'clock).

The breading cages were cages made of polycarbonate. The number of animals breaded in each cage was 4 mice/cage.

Feeding stuff used was a solid feed for experimental animals named MF (available from Oriental Yeast Co., Ltd.), and was freely fed to the animals. Drinking water was tap water to which sodium hypochlorite (PURELOX, available from Oyalox Co., Ltd.) was added so as to be a chlorine concentration of about 5 ppm, and was freely fed to the animals through water feed bottles. Animal bedding used was SUNFLAKE (fir tree, power planer shavings, available from Charles River Laboratories Japan, Inc.). The feeding stuff and breading tools were each sterilized in an autoclave (at 121° C. for 30 minutes).

The cages and bedding were replaced at the time of grouping, and on the day of auricular lymph node extraction (when the animals were transferred from the animal room). The water feed bottles and racks were replaced at the time of the grouping.

[Test Method]

<<Group Constitution>>

The group constitution used in measurement test of the SI value is presented in Table 1.

TABLE 1

| Test group | Sensitizing substance | Sensitizing dose (μL/auricle) | Number of times of sensitizing treatment | Number of animals (animal number) |
|---|---|---|---|---|
| Medium control group | Medium only | 25 | Once/day × 3 days | 4 (1-4) |
| Positive control group | 25.0% HCA | 25 | Once/day × 3 days | 4 (5-8) |

[Preparation]

<<Test Substance>>

Weighing conditions for the test substance are presented in Table 2. The test substance was weighed in a measuring flask, and was fixed to a constant volume of 1 mL by adding a medium to the flask. The prepared liquid was put in a light-blocked airtight container (formed of glass).

TABLE 2

| | Prepared concentration (w/v %) | Amount of test substance weighed (g) |
|---|---|---|
| Test substance | 50.0 | 0.5 |

<<Positive Control Substance>>

HCA (0.25 g) was accurately weighed, and was prepared as a 1 mL of 25.0 w/v % liquid by addition of a medium. The prepared liquid was put in a light-blocked airtight container (formed of glass).

<<BrdU>>

In a measuring flask, 200 mg of 5-bromo-2'-deoxyuridine (BrdU, available from Nacalai Tesque, Inc.) was accurately weighed. Then, a physiological saline (available from Otsuka Pharmaceutical Co., Ltd.) was added thereto, and was subjected to ultrasonic irradiation for dissolving. The resultant solution was fixed to a constant volume of 20 mL to prepare a 10 mg/mL liquid (a BrdU preparation liquid). The preparation liquid was filtered and sterilized through a sterilization filter, and was put in a sterilized container.

<<Preparation Timing and Storage Period>>

The positive control substance preparation liquid was prepared on the day before the sensitization start day, and was stored in a cold place until use. The medium and the test substance preparation liquid were each prepared on the day of sensitization. The BrdU liquid was prepared two days before administration, and was stored in a cold place until the day of administration.

[Sensitization and BrdU Administration]

<<Sensitization>>

The prepared liquids of the test substance and positive control substance, and the medium were applied to both auricles of the animals in an amount of 25 μL for each. A micropipette was used for the application. This operation was performed once a day on three consecutive days.

<<BrdU Administration>>

The BrdU preparation liquid was administered into the abdominal cavity of the animals once about 48 hours after the final sensitization in an amount of 0.5 mL per animal.

[Observation and Tests]

<<Performance Status>>

All animals used for the test were observed more than once a day from the sensitization start day until the auricular lymph node extraction day (i.e., the day when the animals were transferred from the animal room). The observation days were counted in a manner that the sensitization start day was Day 1.

<<Measurement of Body Weight>>

The body weight was measured on the sensitization start day and the auricular lymph node extraction day (i.e., the day when the animals were transferred from the animal room). The average value and standard error of the body weight per group were calculated.

<<Auricular Lymph Node Extraction and Weight Measurement>>

About twenty four hours after the BrdU administration, the animals were euthanized, and the auricular lymph nodes were extracted. Tissues surrounding the auricular lymph nodes were removed. Both auricular lymph nodes were weighed simultaneously. The average value and standard error of the weight of the auricular lymph nodes per group were calculated. After the weight measurement, the auricular lymph nodes were freeze-stored per individual in a biomedical freezer set to −20° C.

<<Measurement of Amount of BrdU Intake>>

After the freeze-stored auricular lymph nodes were returned to room temperature, the auricular lymph nodes were ground by the addition of a physiological saline, and were suspended. The suspension liquid was filtered and then dispensed into a 96-well microplate, 3 wells/individual, and the amount of BrdU intake was measured according to the ELISA method. The reagent used was a commercially available kit (CELL PROLIFERATION ELISA, BRDU, COLORIMETRIC, CAT. NO. 1647229 available from Roche Diagnostics gmbh). The optical densities (OD 370 nm to OD 492 nm, an amount of BrdU intake) obtained with a multi-plate reader (FLUOSTAR OPTIMA available from BMG LABTECH Inc.) from the three wells per individual were averaged, and the averaged value was used as a BrdU measurement of each individual.

[Evaluation of Result]

<<Calculation of Stimulation Index (SI)>>

The BrdU measurement of each individual was divided by the averaged value of BrdU measurement of the medium control group, to calculate the SI value of each individual. The SI value of each test group was the averaged value of the SI values of the individuals. The SI values were rounded off at the second decimal place, and expressed to the first decimal place.

$$SI = \frac{\text{Average value of } BrdU \text{ measurement of each individual (average value of 3 wells)}}{\text{Average value of } BrdU \text{ measurement of medium control group (average value of 4 mice)}}$$

Examples 1 to 15 and Comparative Examples 1 to 3

The following materials (A) to (E) were used to prepare an active-energy-ray-curable composition according to the routine manner. The amounts of these materials (A) to (E) are presented in the columns of Tables 3-1 to 3-3, where the units of the values are "part(s) by mass".

(A) Monofunctional (meth)acrylate
(B) Multifunctional (meth)acrylate
(C) Photoradical polymerization initiator negative in skin sensitization
(D) Polyester-structure-containing polymer
(E) Other polymers The obtained active-energy-ray-curable compositions were used to measure viscosity in the following manner.

<Viscosity>

A cone-and-plate rotary viscometer VISCOMETER TVE-22L with a cone rotor (1°34'×R24) (available from Toki Sangyo Co., Ltd) was used to measure the viscosity of each of the prepared active-energy-ray-curable compositions at 25° C. under the following conditions: number of revolutions: 50 rpm, temperature of thermostatic circulating water: 25° C. Here, VISCOMATE VM-150III was used to adjust temperature of the circulating water. Results are presented in Tables 3-1 to 3-3. Here, all of the active-energy-ray-curable compositions of the Examples had a viscosity of 5 mPa·s or more but 18 mPa·s or less at 25° C.

First, the active-energy-ray-curable composition was handled as follows. Specifically, the ink was filled and sealed in an aluminium pouch bag having a shape illustrated in FIG. 4 so that the ink did not contain bubbles. Then, the sealed pouch bag containing the ink was housed in a plastic cartridge as illustrated in FIG. 5. In a body of a device that can house this cartridge, an ink channel was disposed between the cartridge and a GEN4 head (available from Ricoh Printing Systems, Ltd.). The ink was ejected through inkjet by the ink channel to prepare a solid-coated film having a square of about 3 cm×about 3 cm on a propylene substrate that was subjected to the corona-discharge surface treatment (product name: ESTER FILM E5100, corona treated surface, available from TOYOBO CO., LTD.), or on a polyethylene terephthalate substrate that was not surface-treated (product name: ESTER FILM E5100, non-treated surface, available from TOYOBO CO., LTD.). An amount of ink droplets jetted was adjusted so that an average thickness of the solid coated film was about 10 μm.

The prepared solid coated film was cured at a wavelength that corresponds to the UVA region under the following light intensity conditions: 0.2 W/cm$^2$ and 3,000 mJ/cm$^2$ to obtain a cured product. The cured product was used for evaluation of close adhesiveness.

Next, each of the active-energy-ray-curable compositions was evaluated for close adhesiveness between the substrate and the cured coated film. Results are presented in Tables 3-1 to 3-3.

<Close Adhesiveness>

Close adhesiveness was evaluated in the following manner. First, the active-energy-ray-curable composition was ejected through inkjet on a surface of a film that had been subjected to the corona-discharge surface treatment, and on a surface of a film that had not been surface-treated. Here, the film used was a commercially available PET film (ESTER FILM E5100, average thickness: 100 μm, available from TOYOBO CO., LTD.), which is a versatile film material widely used for packing materials and industrial materials. Then, the film was irradiated with light using an UV irradiator LH6 (D valve) (available from Fusion Systems Japan) to cure the composition. The thus-obtained solid-coated film was measured by the crosscut method according to JIS-K-5600-5-6, and was evaluated for "close adhesiveness" based on the following criteria.

Moreover, a tensile testing machine (device name: "Autograph" AG-10kNX plus, available from SHIMADZU CORPORATION) was used to measure stress (close adhesiveness) necessary for peeling the coated film of a prescribed area away from the substrate.

[Evaluation Criteria]

A: The coated film was not peeled, or was slightly peeled at a crossing point between two cut lines. The coated film had close adhesiveness of 10 kPa or more.

B: The coated film was not peeled, or was slightly peeled at a crossing point between two cut lines. The coated film had close adhesiveness of 1 kPa or more but less than 10 kPa.

C: The coated film was not clearly peeled, but had close adhesiveness of less than 1 kPa.

D: The coated film was clearly peeled.

TABLE 3-1

| | | Example | | | | | | | |
|---|---|---|---|---|---|---|---|---|---|
| | | 1 | 2 | 3 | 4 | 5 | 6 | 7 | 8 |
| A: Monofunctional (meth)acrylate | A1 | 70 | — | — | — | — | — | — | — |
| | A2 | — | 70 | 70 | 70 | 70 | — | — | 70 |
| | A3 | — | — | — | — | — | 70 | — | — |
| | A4 | — | — | — | — | — | — | 70 | — |
| B: Multifunctional (meth)acrylate | B1 | — | — | — | — | — | — | — | — |
| | B2 | 30 | 30 | 30 | 30 | 30 | 30 | 30 | 30 |
| | B3 | — | — | — | — | — | — | — | — |
| | B4 | — | — | — | — | — | — | — | — |
| | B5 | — | — | — | — | — | — | — | — |
| C: Polymerization initiator | C1 | 10 | 10 | 10 | 10 | 10 | 10 | 10 | — |
| | C2 | — | — | — | — | — | — | — | 10 |
| D: Polyester-structure-containing structure | D1 | 10 | — | 5 | 8 | 15 | 10 | 10 | 10 |
| | D2 | — | 10 | 5 | — | — | — | — | — |
| | D3 | — | — | — | — | — | — | — | — |
| E: Other polymers Carbon Black | E1 | — | — | — | — | — | — | — | — |
| | | — | — | — | — | — | — | — | 5 |

TABLE 3-1-continued

| | Example | | | | | | | |
|---|---|---|---|---|---|---|---|---|
| | 1 | 2 | 3 | 4 | 5 | 6 | 7 | 8 |
| Viscosity (25° C., mPa·s) | 7 | 8 | 8 | 6 | 10 | 8 | 9 | 8 |
| Close adhesiveness to PET substrate (surface subjected to corona-discharge surface treatment) | B | B | B | B | A | B | B | B |
| Close adhesiveness to PET substrate (non-treated surface) | B | B | B | B | A | B | B | B |

TABLE 3-2

| | | Example | | | | | | |
|---|---|---|---|---|---|---|---|---|
| | | 9 | 10 | 11 | 12 | 13 | 14 | 15 |
| A: Monofunctional (meth)acrylate | A1 | — | — | — | — | — | — | — |
| | A2 | 80 | 75 | 70 | 85 | 50 | 20 | 70 |
| | A3 | — | — | — | — | — | 50 | — |
| | A4 | — | — | — | — | — | — | — |
| B: Multifunctional (meth)acrylate | B1 | 20 | — | — | — | — | — | — |
| | B2 | — | — | — | — | 50 | 15 | 30 |
| | B3 | — | 25 | — | — | — | 10 | — |
| | B4 | — | — | 30 | — | — | 5 | — |
| | B5 | — | — | — | 15 | — | — | — |
| C: Polymerization initiator | C1 | 10 | 10 | 10 | 5 | 15 | 5 | 10 |
| | C2 | — | — | — | — | — | 5 | — |
| D: Polyester-structure-containing structure | D1 | 10 | 10 | 10 | 10 | 20 | 8 | — |
| | D2 | — | — | — | — | — | 2 | — |
| | D3 | — | — | — | — | — | — | 10 |
| E: Other polymers Carbon Black | E1 | — | — | — | — | — | — | — |
| | | — | — | — | — | — | — | — |
| Viscosity (25° C., mPa·s) | | 6 | 7 | 8 | 8 | 15 | 9 | 12 |
| Close adhesiveness to PET substrate (surface subjected to corona-discharge surface treatment) | | B | B | B | B | A | B | B |
| Close adhesiveness to PET substrate (non-treated surface) | | B | B | B | B | A | B | C |

TABLE 3-3

| | | Comparative Example | | |
|---|---|---|---|---|
| | | 1 | 2 | 3 |
| A: Monofunctional (meth)acrylate | A1 | 70 | — | — |
| | A2 | — | 70 | — |
| | A3 | — | — | — |
| | A4 | — | — | — |
| B: Multifunctional (meth)acrylate | B1 | — | — | — |
| | B2 | 30 | — | 30 |
| | B3 | — | — | — |
| | B4 | — | — | — |
| | B5 | — | — | — |
| C: Polymerization initiator | C1 | 10 | 10 | 10 |
| | C2 | — | — | — |
| D: Polyester-structure-containing structure | D1 | — | 10 | 10 |
| | D2 | — | — | — |
| | D3 | — | — | — |

TABLE 3-3-continued

|  |  | Comparative Example | | |
|---|---|---|---|---|
|  |  | 1 | 2 | 3 |
| E: Other polymers | E1 | 10 | — | — |
| Carbon Black |  | — | — | — |
| Viscosity (25° C., mPa · s) |  | 9 | 7 | 150 |
| Close adhesiveness to PET substrate (surface subjected to corona-discharge surface treatment) |  | B | *2 | *3 |
| Close adhesiveness to PET substrate (non-treated surface) |  | D | *2 | *3 |

*2: The ink was not cured.
*3: Due to high viscosity, the ink could not be ejected.

Details of A1 to A4, B1 to B5, C1 to C2, D1 to D3, and E1 in Tables 3-1 to 3-3 are as follows.

Note that, the values in parentheses are SI values measured by LLNA test described in the above (1). In addition, "negative" means "being negative in skin sensitization", and "nothing" means "having no skin sensitization". Each of the "being negative in skin sensitization" and the "having no skin sensitization" is determined according to the MSDS (Material Safety Data Sheet) described in the (2), or the reference described in the (3). Moreover, "positive" means the remark "R43" that indicates "being problematic in skin sensitization" in EU directive Risk Phrases; or the remarks "H317" that indicates "being problematic in skin sensitization" in the Regulation on CLP. Here, the polymer components have high molecular weight, and have difficulty in passing through skin. Therefore, the polymer components typically have no skin sensitization.

—(A) Monofunctional (Meth)Acrylate—
  A1: t-Butyl acrylate, "t-butyl acrylate" (positive), available from Osaka Organic Chemical Industry Ltd.
  A2: t-butyl methacrylate, "ACRYESTER TB", available from MITSUBISHI RAYON CO. LTD., (negative) which was evaluated according to the reference (test method: maximization method)
  A3: n-Pentyl methacrylate, "n-AmylMethacrylate", available from Zhangjiagang Render Chemical, (negative) which was evaluated according to the reference (test method: maximization method)
  A4: n-Hexyl methacrylate, "n-Hexyl Methacrylate", available from Tokyo Chemical Industry Co., Ltd., (negative) which was evaluated according to the reference (test method: maximization method)

—(B) Multifunctional (Meth)Acrylate—
  B1: Ethyleneoxide-modified trimethylolpropane triacrylate, "A-TMPT-3EO" (positive), available from Shin Nakamura Chemical Co., Ltd.
  B2: Glycerol dimethacrylate, "701" (1.2), available from Shin Nakamura Chemical Co., Ltd.
  B3: Tricyclodecane dimethanol diacrylate, "DCP" (1.3), available from Shin Nakamura Chemical Co., Ltd.
  B4: Ethyleneoxide-modified trimethylolpropane trimethacrylate, "TMPT-3EO" (1.0), available from Shin Nakamura Chemical Co., Ltd.
  B5: Caprolactone-modified dipentaerythritolhexaacrylate, available from Nippon Kayaku Co., Ltd., (negative) which was evaluated according to the MSDS (test method: OECD Test Guideline 406)

—(C) Photoradical Polymerization Initiator Negative in Skin Sensitization—
  C1: 1-Hydroxy-cyclohexyl phenyl ketone, "IRGACURE 184", available from BASF (nothing) which was evaluated according to the MSDS (test method: OECD Test Guideline 406)
  C2: 2-Dimethylamino-2-(4-methylbenzyl)-1-(4-morpholin-4-yl-phenyl)butan-1-one, "IRGACURE 379", available from BASF (nothing) which was evaluated according to the MSDS (test method: OECD Test Guideline 406)

—(D) Polyester-Structure-Containing Polymer—
  D1: Polyester-structure-containing polymer, "VYLON 802", available from TOYOBO CO., LTD., number average molecular weight: 3,000, hydroxyl value: 37 mg KOH/g, acid value: less than 1 mg KOH/g,
  D2: Polyester-structure-containing polymer, "VYLON GK810", available from TOYOBO CO., LTD., number average molecular weight: 6,000, hydroxyl value: 19 mg KOH/g, acid value: 5 mg KOH/g
  D3: Polyester-structure-containing polymer, "VYLON 650", available from TOYOBO CO., LTD., number average molecular weight: 23,000, hydroxyl value: 5 mg KOH/g, acid value: less than 2 mg KOH/g —Other Polymers—
  E1: Styrene-acryl resin, "JONCRYL 611", available from BASF, acid value: 53 mg KOH/g, weight average molecular weight: 8,100

—Carbon Black—
  An amount of carbon black presented was an amount of a mixture containing a polymeric dispersant (SOLSPERSE 39000, available from The Lubrizol Corporation) and carbon black #10 (available from Mitsubishi Chemical Corporation) at a ratio of 3:1 (polymeric dispersant:carbon black #10).

Comparison between Comparative Example 1 and Example 1 indicates that when the active-energy-ray-curable composition contains the polyester-structure-containing polymer as a polymer component of group D, the resultant ink can attain close adhesiveness to a polyethylene terephthalate substrate that is not surface-treated.

As is clear from Comparative Example 2, the active-energy-ray-curable composition containing no multifunctional (meth)acrylate is poor in curing ability.

In addition, as is clear from Comparative Example 3, the composition containing no monofunctional (meth)acrylate has high viscosity, and printing cannot be performed through inkjet.

From the results of Examples 1 and 2, it is found that when the monofunctional (meth)acrylate of group A contains the compound that is not problematic in skin sensitization, the composition can attain close adhesiveness to a polyethylene terephthalate substrate that is not surface-treated. Therefore, in order to safely use the ink, use of the compound that is not problematic in skin sensitization is desirably used for the ink.

From the results of Examples 2 and 3, it is found that even if the active-energy-ray-curable composition contains various kinds of polyester-structure-containing polymers or contains different polyester-structure-containing polymer, all of the compounds can attain close adhesiveness to a polyethylene terephthalate substrate that is not surface-treated.

From the results of Examples 4 and 5, it is found that even if an amount of the polyester-structure-containing polymer increases or decreases, the resultant composition can attain close adhesiveness to a polyethylene terephthalate substrate that is not surface-treated.

From the results of Examples 1, 6, and 7, it is found that when the monofunctional (meth)acrylate of group A contains each compound that is not problematic in skin sensitization, all of the resultant compounds can attain close adhesiveness to PET that is not surface-treated.

From the result of Example 8, even if the active-energy-ray-curable composition contains a colorant and another kind of the polymerization initiator of group C, the compound can attain close adhesiveness to PET that is not surface-treated.

From the results of Examples 9, 10, 11, 12, and 13, it is found that even if the active-energy-ray-curable composition contains any multifunctional (meth)acrylate of group B, all of the resultant compounds can attain close adhesiveness to PET that is not surface-treated. However, in order to safely use the ink, the compound that is not problematic in skin sensitization is desirably used.

From the result of Example 14, it is found that even if two or more materials of each of the groups are used for the active-energy-ray-curable composition, all of the resultant composition can attain close adhesiveness to a polyethylene terephthalate substrate that is not surface-treated. Therefore, optimum materials may be used depending on the intended purpose.

The active-energy-ray-curable composition of Example 15 has favorable close adhesiveness. However, compared with the other Examples, ink droplets elongated during inkjet ejection, and a rather large amount of mist was generated. Therefore, the active-energy-ray-curable composition more preferably contains polymer components having lower molecular weight.

In all of the aforementioned compositions of Examples, the coated films after light irradiation were not sticky based on confirmation through touch with a finger, and were favorably cured.

Here, the polyester-structure-containing polymer is precipitated when the active-energy-ray-curable composition is added dropwise to a solvent (e.g., methanol), and can be isolated by filtrating the composition dissolved in the solvent. When the precipitated product is analyzed by infrared spectroscopy, absorption peak originated from an ester bond can be confirmed at about 1,700 cm$^{-1}$. The other components can be confirmed for whether the other components are identical to the intended other components by gas chromatography mass spectrometry.

Examples 16 to 27 and Comparative Example 4

The following materials (A) to (E) were used to prepare an active-energy-ray-curable composition according to the routine manner. The amounts of these materials (A) to (E) are presented in the columns of Examples and Comparative Examples in the following Tables 4-1-1, 4-1-2, 4-2-1, 4-2-2, and 4-3, where the units of the values are "part(s) by mass".
(A) Monofunctional (meth)acrylate
(B) Multifunctional (meth)acrylate
(C) Photoradical polymerization initiator negative in skin sensitization
(D) Polyester-structure-containing polymer
(E) Other polymers The obtained active-energy-ray-curable compositions were used to measure viscosity in the following manner.
<Viscosity>

The viscosity was measured in the same manner as in Example 1. Results are presented in Tables 4-1-1, 4-1-2, 4-2-1, 4-2-2, and 4-3. Here, all of the active-energy-ray-curable compositions of the Examples had a viscosity of 8 mPa·s or more but 11 mPa·s or less at 25° C.

The obtained active-energy-ray-curable composition was used to prepare a cured product in the same manner as in Example 1. Then, the cured product was evaluated for "close adhesiveness" to a polyethylene terephthalate substrate (non-treated surface) in the same manner as in Example 1.

In addition, the active-energy-ray-curable composition was used to prepare a cured product in the same manner as in Example 1 except that a polyethylene terephthalate substrate was changed to a color steel sheet substrate (product name: YODOCOLOR GL (GS200), available from Yodogawa Steel Works, Ltd.). The cured product formed on the color steel sheet substrate was evaluated for water resistance of the coated film (change in appearance and close adhesiveness in water).

<Close Adhesiveness>

The close adhesiveness was evaluated in the same manner as in Example 1. In the following Tables 4-1-1, 4-1-2, 4-2-1, 4-2-2, and 4-3, the values in parentheses of the close adhesiveness represent the number of squares that are not peeled in 100 squares.

<Water Resistance of Coated Film>

—Change in Appearance—

The obtained cured film formed on the color steel sheet substrate was immersed in water (40° C.), and was left to stand for 24 hours. A part of the cured product immersed in water was visually observed to evaluate the part for "change in appearance".

—Close Adhesiveness in Water—

The "close adhesiveness in water" was evaluated in the same manner as in the evaluation of close adhesiveness of Example 1 except that the cured product formed on the polyethylene terephthalate substrate was changed to the cured product formed on the color steel sheet substrate; and the cured product was immersed in water (40° C.), and was left to stand for 24 hours after the cured product was cut by the cross cut method according to JIS-K-5600-5-6. In the following Tables 4-1-1, 4-1-2, 4-2-1, 4-2-2, and 4-3, the values in parentheses of the close adhesiveness represent the number of squares that are not peeled in 100 squares.

TABLE 4-1-1

| | | Example | | |
|---|---|---|---|---|
| | | 16 | 17 | 18 |
| A: Monofunctional (meth)acrylate | A2 | 70 | 70 | 70 |
| | A3 | — | — | — |
| | A4 | — | — | — |
| B: Multifunctional (meth)acrylate | B5 | 30 | 30 | — |
| | B6 | — | — | 30 |
| C: Polymerization initiator | C2 | 10 | 10 | 10 |
| | C3 | — | — | — |
| D: Polyester-structure-containing structure | D1 | 5 | 3 | 5 |
| | D2 | — | — | — |
| E: Other polymers | E1 | 5 | 7 | 5 |
| | E2 | — | — | — |
| | E3 | — | — | — |
| | E4 | — | — | — |
| | E5 | — | — | — |
| Carbon Black | | — | — | — |
| Viscosity (25° C., mPa · s) | | 8 | 9 | 10 |
| Water resistance of coated film on color steel sheet substrate | Change in appearance | Unchanged | Unchanged | Unchanged |
| | Close adhesiveness in water | A (100) | A (100) | A (100) |
| Close adhesiveness to PET substrate (non-treated surface) | | A (100) | A (100) | A (100) |

TABLE 4-1-2

|  |  | Example | | |
|---|---|---|---|---|
|  |  | 19 | 20 | 21 |
| A: Monofunctional (meth)acrylate | A2 | — | — | 70 |
|  | A3 | 70 | — | — |
|  | A4 | — | 70 | — |
| B: Multifunctional (meth)acrylate | B5 | 30 | 30 | 30 |
|  | B6 | — | — | — |
| C: Polymerization initiator | C2 | 10 | 10 | 10 |
|  | C3 | — | — | — |
| D: Polyester-structure-containing structure | D1 | 5 | 5 | 5 |
|  | D2 | — | — | 5 |
| E: Other polymers | E1 | 5 | 5 | 5 |
|  | E2 | — | — | — |
|  | E3 | — | — | — |
|  | E4 | — | — | — |
|  | E5 | — | — | — |
| Carbon Black |  | — | — | — |
| Viscosity (25° C., mPa · s) |  | 10 | 11 | 11 |
| Water resistance of coated film on color steel sheet substrate | Change in appearance | Unchanged | Unchanged | Unchanged |
|  | Close adhesiveness in water | A (100) | A (100) | A (100) |
| Close adhesiveness to PET substrate (non-treated surface) |  | A (100) | A (100) | A (100) |

TABLE 4-2-1

|  |  | Example | | |
|---|---|---|---|---|
|  |  | 22 | 23 | 24 |
| A: Monofunctional (meth)acrylate | A2 | 70 | 70 | 70 |
|  | A3 | — | — | — |
|  | A4 | — | — | — |
| B: Multifunctional (meth)acrylate | B5 | 30 | 30 | 30 |
|  | B6 | — | — | — |
| C: Polymerization initiator | C2 | 10 | 10 | 10 |
|  | C3 | — | — | — |
| D: Polyester-structure-containing structure | D1 | 5 | 5 | 5 |
|  | D2 | — | — | — |
| E: Other polymers | E1 | — | — | — |
|  | E2 | 5 | — | — |
|  | E3 | — | 5 | — |
|  | E4 | — | — | 5 |
|  | E5 | — | — | — |
| Carbon Black |  | — | — | — |
| Viscosity (25° C., mPa · s) |  | 8 | 8 | 10 |
| Water resistance of coated film on color steel sheet substrate | Change in appearance | Unchanged | Unchanged | Unchanged |
|  | Close adhesiveness in water | A (100) | A (100) | A (100) |
| Close adhesiveness to PET substrate (non-treated surface) |  | A (100) | A (100) | A (100) |

TABLE 4-2-2

|  |  | Example | | |
|---|---|---|---|---|
|  |  | 25 | 26 | 27 |
| A: Monofunctional (meth)acrylate | A2 | 70 | 70 | 70 |
|  | A3 | — | — | — |
|  | A4 | — | — | — |
| B: Multifunctional (meth)acrylate | B5 | 30 | 30 | 30 |
|  | B6 | — | — | — |
| C: Polymerization initiator | C2 | 10 | — | 10 |
|  | C3 | — | 5 | — |
| D: Polyester-structure-containing structure | D1 | 5 | 5 | 5 |
|  | D2 | — | — | — |
| E: Other polymers | E1 | — | 5 | 5 |
|  | E2 | — | — | — |
|  | E3 | — | — | — |
|  | E4 | — | — | — |
|  | E5 | 5 | — | — |
| Carbon Black |  | — | — | 4 |
| Viscosity (25° C., mPa · s) |  | 9 | 8 | 10 |
| Water resistance of coated film on color steel sheet substrate | Change in appearance | Unchanged | Unchanged | Unchanged |
|  | Close adhesiveness in water | A (100) | A (100) | A (100) |
| Close adhesiveness to PET substrate (non-treated surface) |  | A (100) | A (100) | A (100) |

TABLE 4-3

|  |  | Comparative Example 4 |
|---|---|---|
| A: Monofunctional (meth)acrylate | A2 | 70 |
|  | A3 | — |
|  | A4 | — |
| B: Multifunctional (meth)acrylate | B5 | 30 |
|  | B6 | — |
| C: Polymerization initiator | C2 | 10 |
|  | C3 | — |
| D: Polyester-structure-containing structure | D1 | — |
|  | D2 | — |
| E: Other polymers | E1 | 10 |
|  | E2 | — |
|  | E3 | — |
|  | E4 | — |
|  | E5 | — |
| Carbon Black |  | — |
| Viscosity (25° C., mPa · s) |  | 8 |
| Water resistance of coated film on color steel sheet substrate | Change in appearance | Unchanged |
|  | Close adhesiveness in water | A (100) |
| Close adhesiveness to PET substrate (non-treated surface) |  | D (0) |

Details of A2 to A4, B5 to B6, C2 to C3, D1 to D2, and E1 to E5 in Tables 4-1 to 4-3 are as follows.

The values in parentheses are SI values measured by LLNA test described in the above (1). In addition, "negative" means "being negative in skin sensitization", and "nothing" means "having no skin sensitization". Each of the "being negative in skin sensitization" and the "having no skin sensitization" is determined according to the MSDS (Material Safety Data Sheet) described in the (2), or the reference described in the (3). Moreover, "positive" means the remark "R43" that indicates "being problematic in skin sensitization" in EU directive Risk Phrases; or the remarks "H317" that indicates "being problematic in skin sensitization" in the Regulation on CLP. Here, the polymer components have high molecular weight, and have difficulty in passing through skin. Therefore, the polymer components typically have no skin sensitization.

—(A) Monofunctional (Meth)Acrylate—

A2: t-butyl methacrylate, "ACRYESTER TB", available from MITSUBISHI RAYON CO. LTD., (negative) which was evaluated according to the reference (test method: maximization method)

A3: n-Pentyl methacrylate, "n-AmylMethacrylate", available from Zhangjiagang Render Chemical, (negative) which was evaluated according to the reference (test method: maximization method)

A4: n-Hexyl methacrylate, "n-Hexyl Methacrylate", available from Tokyo Chemical Industry Co., Ltd., (negative) which was evaluated according to the reference (test method: maximization method)

—(B) Multifunctional (Meth)Acrylate—

B5: Diethylene glycol dimethacrylate, available from Shin Nakamura Chemical Co., Ltd., (1.1)

B6: Trimethylolpropane trimethacrylate, available from Shin Nakamura Chemical Co., Ltd., (1.9)

—(C) Photoradical Polymerization Initiator Negative in Skin Sensitization—

C2: 2-Dimethylamino-2-(4-methylbenzyl)-1-(4-morpholinophenyl)butan-1-one, "IRGACURE 379", available from BASF (nothing) which was evaluated according to the MSDS (test method: OECD Test Guideline 406)

C3: 2-[4-(Methylthio)benzoyl]-2-(4-morpholinyl)propane, "IRGACURE 907", available from BASF, (nothing) which was evaluated according to the MSDS (test method: OECD Test Guideline 406)

—(D) Polyester-Structure-Containing Polymer—

D1: Polyester-structure-containing polymer, "VYLON 802", available from TOYOBO CO., LTD., number average molecular weight: 3,000, hydroxyl value: 37 mg KOH/g, acid value: less than 1 mg KOH/g D2: Polyester-structure-containing polymer, "VYLON GK810", available from TOYOBO CO., LTD., number average molecular weight: 6,000, hydroxyl value: 19 mg KOH/g, acid value: 5 mg KOH/g —(E) Other Polymers—

E1: Styrene-acryl resin, "JONCRYL 611", available from BASF, acid value: 53 mg KOH/g, glass transition temperature: 50° C.

E2: Acrylic resin, "JONCRYL 804", available from BASF, acid value: 15 mg KOH/g, glass transition temperature: 70° C.

E3: Low-molecular-weight polystyrene resin, "HIMER ST-95", available from Sanyo Chemical Industries, Ltd.

E4: Acrylic resin, "ARUFON (Registered Trademark) UC-3000 (solid)", available from Toagosei Company, Limited, acid value: 74 mg KOH/g, glass transition temperature: 65° C.

E5: Polystyrene resin, "VS-1063", available from SEIKO PMC CORPORATION, acid value: 0 mg KOH/g, glass transition temperature: 100° C.

—Carbon Black—

An amount of carbon black presented was an amount of a mixture containing a polymeric dispersant (SOLSPERSE 39000, available from The Lubrizol Corporation) and carbon black #10 (available from Mitsubishi Chemical Corporation) at a ratio of 3:1 (polymeric dispersant:carbon black #10).

From the results of Examples 16 and 17, it is found that when the polyester-structure-containing polymer is used in combination with the other polymers, the thus-obtained active-energy-ray-curable composition can obtain both close adhesiveness to a polyethylene terephthalate substrate and water resistance to the color steel sheet. In addition, it is found that the active-energy-ray-curable composition does not cause problems due to difference in a ratio at which the polyester-structure-containing polymer is used in combination with the other polymers. Thus, it is found that the polyester-structure-containing polymer and the ratio between the other polymers and the polyester-structure-containing polymer can be appropriately selected depending on other properties to be required.

From the results of Examples 18 and 20, it is found that the active-energy-ray-curable composition is excellent in close adhesiveness and water resistance even if the monomers used are different. Therefore, the monomers can be appropriately selected depending on other properties to be required.

From the results of Examples 21 and 25, it is found that the active-energy-ray-curable composition is excellent in close adhesiveness and water resistance even if the kinds of the other polymers used in combination with the polyester-structure-containing polymer are different. Therefore, the other polymers and the polyester-structure-containing polymer can be appropriately selected depending on other properties to be required.

From the result of Examples 26, it is found that the active-energy-ray-curable composition is excellent in close adhesiveness and water resistance even if the kinds of the polymerization initiators used are different. Therefore, the polymerization initiators can be appropriately selected depending on other properties to be required.

From the results of Example 27, it is found that the active-energy-ray-curable composition is excellent in close adhesiveness and water resistance even if it contains the colorant.

Note that, the polyester-structure-containing polymer is precipitated when the active-energy-ray-curable composition is added dropwise to a solvent (e.g., methanol), and can be isolated by filtrating the composition dissolved in the solvent. When the precipitated product is analyzed by infrared spectroscopy, absorption peak originated from an ester bond can be confirmed at about 1,700 cm$^{-1}$. The other components can be confirmed for whether the other components are identical to the intended other components by gas chromatography mass spectrometry.

Examples 28 to 36 and Comparative Examples 5 to 13

The following materials (A) to (F) were used to prepare an active-energy-ray-curable composition according to the routine manner. The amounts of these materials (A) to (F) used are presented in the columns of Examples and Comparative Examples in the following Tables 5-1 and 5-2, where the units of the values are "part(s) by weight".

(A) Monofunctional (meth)acrylate
(B) Multifunctional (meth)acrylate
(C) Photoradical polymerization initiator negative in skin sensitization
(D) Polyester-structure-containing polymer
(E) Other polymers
(F) Polymerization inhibitor The obtained active-energy-ray-curable compositions were measured for viscosity in the following manner.

<Viscosity>

The viscosity was measured in the same manner as in Example 1. Results are presented in Tables 5-1 and 5-2. All of the active-energy-ray-curable compositions of the Examples had a viscosity of 8 mPa·s or more but 15 mPa·s or less at 25° C.

The obtained active-energy-ray-curable composition was used to prepare a cured product in the same manner as in Example 1. Then, the cured product was evaluated for "close adhesiveness" to a polyethylene terephthalate substrate (non-treated surface) in the same manner as in Example 1.

<Close Adhesiveness>

The close adhesiveness was evaluated in the same manner as in Example 1.

<Ability to Recover Ejection>

The active-energy-ray-curable composition was handled in the same manner as in Example 1. First, an ink channel was disposed so that the ink channel reached a GEN4 head (available from Ricoh Printing Systems, Ltd.). Then, the obtained active-energy-ray-curable composition was ejected on a substrate so that an average thickness of the solid coated film was 7 μm. The head was left to stand at 50° C. for 3 days with a cap of the head removed, followed by performing pressurization maintenance at a prescribed pressurization force. The number of the nozzles capable of ejecting the composition was counted, and was evaluated for "ability to recover ejection" based on the following criteria.

[Evaluation Criteria]

A: After pressurization maintenance of 20 kPa, the number of the nozzles capable of ejecting the composition was all of the nozzles (100%).

B: After pressurization maintenance of 20 kPa, the number of the nozzles capable of ejecting the composition was 90% or more; and after pressurization maintenance of 30 kPa, the number of the nozzles capable of ejecting the composition was all of the nozzles (100%).

C: After pressurization maintenance of 30 kPa, the number of the nozzles capable of ejecting the composition was 50% or more but less than 100%.

D: After pressurization maintenance of 30 kPa, the number of the nozzles capable of ejecting the composition was less than 50%.

TABLE 5-1

| | | Example | | | | | | | | |
|---|---|---|---|---|---|---|---|---|---|---|
| | | 28 | 29 | 30 | 31 | 32 | 33 | 34 | 35 | 36 |
| A: Monofunctional (meth)acrylate | A2 | 70 | 70 | — | — | — | — | 30 | 30 | 70 |
| | A3 | — | — | 70 | 70 | — | — | 30 | 30 | — |
| | A4 | — | — | — | — | 70 | 70 | — | — | — |
| B: Multifunctional (meth)acrylate | B2 | 30 | — | — | — | 30 | — | 20 | 20 | 30 |
| | B3 | — | 30 | — | — | — | 30 | — | — | — |
| | B5 | — | — | 30 | 30 | — | — | 15 | 15 | — |
| C: Polymerization initiator | C1 | 10 | 12 | — | — | 5 | 5 | 5 | 5 | 10 |
| | C2 | — | — | 15 | 15 | — | — | 5 | 5 | — |
| D: Polyester-structure-containing structure | D1 | 10 | — | 15 | 15 | 10 | — | 5 | 5 | 10 |
| | D2 | — | 15 | — | — | — | 10 | — | — | — |
| | D3 | — | — | — | — | — | — | — | — | — |
| E: Other polymers | E1 | — | — | — | — | — | — | 5 | 5 | — |
| F: Polymerization inhibitor | F1 | 0.4 | — | — | — | 0.17 | — | 0.22 | — | 0.4 |
| | F2 | — | — | 0.5 | — | — | — | — | — | — |
| | F3 | — | 0.25 | — | — | — | — | — | — | — |
| | F4 | — | — | — | — | — | 0.15 | — | — | — |
| | F5 | — | — | — | 0.25 | — | — | — | 0.2 | — |
| Carbon Black | | — | — | — | — | — | — | — | — | 5 |
| Viscosity (25° C., mPa · s) | | 8 | 11 | 13 | 13 | 10 | 10 | 14 | 14 | 15 |
| Ratio of incorporation of polymerization inhibitor (F/C) | | 0.040 | 0.021 | 0.033 | 0.017 | 0.034 | 0.030 | 0.022 | 0.020 | 0.040 |
| Close adhesiveness to PET substrate (non-treated surface) | | B | B | B | B | B | B | B | B | B |
| Ability to recover ejectability | | A | A | A | A | B | A | B | A | A |

TABLE 5-2

| | | Comparative Example | | | | | | | | |
|---|---|---|---|---|---|---|---|---|---|---|
| | | 5 | 6 | 7 | 8 | 9 | 10 | 11 | 12 | 13 |
| A: Monofunctional (meth)acrylate | A2 | 70 | 70 | — | — | — | — | 30 | 30 | 70 |
| | A3 | — | — | 70 | 70 | — | — | 30 | 30 | — |
| | A4 | — | — | — | — | 70 | 70 | — | — | — |
| B: Multifunctional (meth)acrylate | B2 | 30 | — | — | — | 30 | — | 20 | 20 | 30 |
| | B3 | — | 30 | — | — | — | 30 | — | — | — |
| | B5 | — | — | 30 | 30 | — | — | 15 | 15 | — |
| C: Polymerization initiator | C1 | 10 | 12 | — | — | 5 | 5 | 5 | 5 | 10 |
| | C2 | — | — | 15 | 15 | — | — | 5 | 5 | — |
| D: Polyester-structure-containing structure | D1 | 10 | — | 15 | 15 | 10 | — | 5 | 5 | — |
| | D2 | — | 15 | — | — | — | 10 | — | — | — |
| | D3 | — | — | — | — | — | — | — | — | 10 |
| E: Other polymers | E1 | — | — | — | — | — | — | 5 | 5 | — |
| F: Polymerization inhibitor | F1 | 0.05 | — | — | — | 0.04 | — | 0.01 | — | 0.08 |
| | F2 | — | — | 0.03 | — | — | — | — | — | — |
| | F3 | — | 0.02 | — | — | — | — | — | — | — |
| | F4 | — | — | — | — | — | 0.04 | — | — | — |
| | F5 | — | — | — | 0.05 | — | — | — | 0.08 | — |

TABLE 5-2-continued

| | Comparative Example | | | | | | | | |
|---|---|---|---|---|---|---|---|---|---|
| | 5 | 6 | 7 | 8 | 9 | 10 | 11 | 12 | 13 |
| Carbon Black | — | — | — | — | — | — | — | — | — |
| Viscosity (25° C., mPa · s) | 8 | 9 | 9 | 9 | 10 | 11 | 12 | 12 | 10 |
| Ratio of incorporation of polymerization inhibitor (F/C) | 0.005 | 0.002 | 0.002 | 0.003 | 0.008 | 0.008 | 0.001 | 0.008 | 0.008 |
| Close adhesiveness to PET substrate (non-treated surface) | B | B | B | B | B | B | B | B | C *2 |
| Ability to recover ejectability | D | C | D | C | D | C | D | C | B |

*2: The ink was difficult to eject.

Details of A2 to A4, B2 to B3, B5, C1 to C2, D1 to D3, E1, and F1 to F5 in Tables 5-1 and 5-2 are as follows.

The values in parentheses are SI values measured by LLNA test described in the above (1). In addition, "negative" means "being negative in skin sensitization", and "nothing" means "having no skin sensitization". Each of the "being negative in skin sensitization" and the "having no skin sensitization" is determined according to the MSDS (Material Safety Data Sheet) described in the (2), or the reference described in the (3). Moreover, "positive" means the remark "R43" that indicates "being problematic in skin sensitization" in EU directive Risk Phrases; or the remarks "H317" that indicates "being problematic in skin sensitization" in the Regulation on CLP. Here, the polymer components have high molecular weight, and have difficulty in passing through skin. Therefore, the polymer components typically have no skin sensitization.

—(A) Monofunctional (Meth)Acrylate—
  A2: t-butyl methacrylate, "ACRYESTER TB", available from MITSUBISHI RAYON CO. LTD., (negative) which was evaluated according to the reference (test method: maximization method)
  A3: n-Pentyl methacrylate, "n-AmylMethacrylate", available from Zhangjiagang Render Chemical, (negative) which was evaluated according to the reference (test method: maximization method)
  A4: n-Hexyl methacrylate, "n-Hexyl Methacrylate", available from Tokyo Chemical Industry Co., Ltd., (negative) which was evaluated according to the reference (test method: maximization method)

—(B) Multifunctional (Meth)Acrylate—
  B2: Glycerol dimethacrylate, "701" (1.2), available from Shin Nakamura Chemical Co., Ltd.
  B3: Tricylodecane dimethanol diacrylate, "DCP" (1.3), available from Shin Nakamura Chemical Co., Ltd.
  B5: Polyethylene glycol dimethacrylate represented by the following Formula 1 (n is nearly equal to 2), "2G", (1.1), available from Shin Nakamura Chemical Co., Ltd.

—(C) Photoradical Polymerization Initiator Negative in Skin Sensitization—
  C1: 1-Hydroxy-cyclohexyl phenyl ketone, "IRGACURE 184", available from BASF (nothing) which was evaluated according to the MSDS (test method: OECD Test Guideline 406)
  C2: 2-Dimethylamino-2-(4-methylbenzyl)-1-(4-morpholin-4-yl-phenyl)butan-1-one, "IRGACURE 379", available from BASF (nothing) which was evaluated according to the MSDS (test method: OECD Test Guideline 406)

—(D) Polyester-Structure-Containing Polymer—
  D1: Polyester-structure-containing polymer, "VYLON 802", available from TOYOBO CO., LTD., number average molecular weight: 3,000, hydroxyl value: 37 mg KOH/g, and acid value: less than 1 mg KOH/g
  D2: Polyester-structure-containing polymer, "VYLON GK810", available from TOYOBO CO., LTD., number average molecular weight: 6,000, hydroxyl value: 19 mg KOH/g, and acid value: 5 mg KOH/g
  D3: Polyester-structure-containing polymer, "VYLON 650", available from TOYOBO CO., LTD., number average molecular weight: 23,000, hydroxyl value: 5 mg KOH/g, and acid value: less than 2 mg KOH/g —(E) Other Polymers—
  E1: Styrene-acryl resin, "JONCRYL 611", available from BASF, acid value: 53 mg KOH/g, and weight average molecular weight: 8,100

—(F) Polymerization Inhibitor—
  F1: 4-Methoxyphenol, "METHOQUINONE", number of hydroxyl group: one, available from Seiko Chemical Co., Ltd
  F2: 4-Methoxy-1-naphthol, "MNT", number of hydroxyl group: one, available from Kawasaki Kasei Chemicals Ltd.
  F3: p-Hydroxyphenol, "HYDROQUINONE", number of hydroxyl groups: two, available from Seiko Chemical Co., Ltd
  F4: Methylhydroquinone, "MH", number of hydroxyl groups: two, available from Seiko Chemical Co., Ltd
  F5: tert-Butylhydroquinone, "TBH", number of hydroxyl groups: two, available from Seiko Chemical Co., Ltd —Carbon Black—
An amount of carbon black presented was an amount of a mixture containing a polymeric dispersant (SOLSPERSE 39000, available from The Lubrizol Corporation) and carbon black #10 (available from Mitsubishi Chemical Corporation) at a ratio of 3:1 (polymeric dispersant:carbon black #10).

Figure 6:
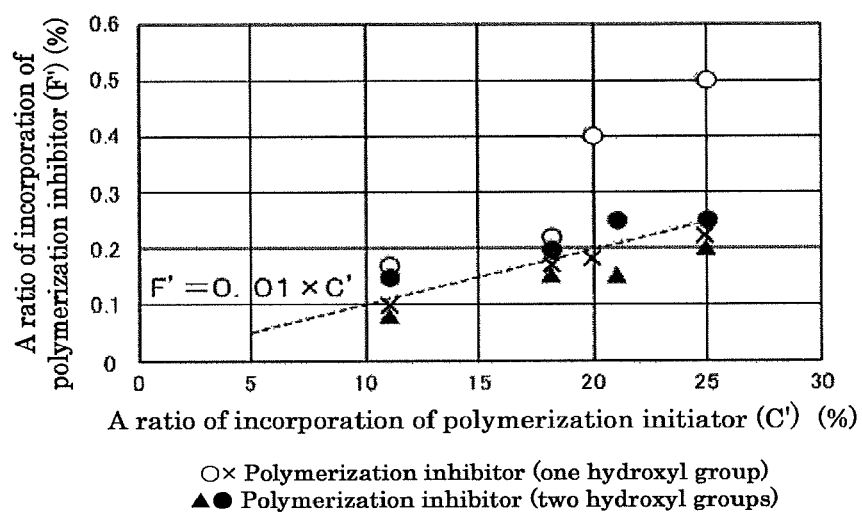
FIG. 6 is a graph of a relationship between an amount (F') of a polymerization inhibitor and an amount (C') of a polymerization initiator.

Comparison between Examples 28 to 35 and Comparative Examples 5 to 13 indicates that each of the active-energy-ray-curable compositions can obtain favorable ability to recover ejection depending on the amount of the polymerization inhibitor of group F. It is found that the amount of the polymerization inhibitor has a border line that divides favorable ability to recover ejection from non-favorable ability to recover ejection. It is found that when an amount of the polymerization initiator of group C is defined as "C", an amount (F') of the polymerization inhibitor of group F is preferably equal to or more than a value obtained by the following formula: F'=0.01×C'. FIG. 6 is a graph of a relationship between C' and F' of Tables 5-1 and 5-2.

In Examples 28 to 35 and Comparative Examples 5 to 12, it is found that the polymerization inhibitor having two hydroxyl groups in a molecule of the polymerization inhibitor can impart favorable ability to recover ejection to the active-energy-ray-curable composition compared with the polymerization inhibitor having one hydroxyl group in a molecule of the polymerization even in a small amount of the polymerization inhibitor. This is likely because the polymerization inhibitor captures radicals generated in the ink to effectively form stable radicals.

In Comparative Example 13, the active-energy-ray-curable ink can obtain excellent close adhesiveness. However, compared with the other Examples, ink droplets elongated during inkjet ejection, and a rather large amount of mist was generated. In addition, it is difficult for radio frequency pulse to capture the ink mist. Therefore, it is found that a molecular weight of the polymer components is preferably small.

In all of the aforementioned Examples, the coated films after light irradiation were not sticky based on confirmation through touch with a finger, and were favorably cured.

Note that, the polyester-structure-containing polymer is precipitated when the active-energy-ray-curable composition is added dropwise to a solvent (e.g., methanol), and can be isolated by filtrating the composition dissolved in the solvent. When the precipitated product is analyzed by infrared spectroscopy, absorption peak originated from an ester bond can be confirmed at about 1,700 cm$^{-1}$. The other components can be confirmed for whether the other components are identical to the intended other components by gas chromatography mass spectrometry.

Aspects of the present disclosure are as follows, for example.

<1> An active-energy-ray-curable composition including:
at least one monofunctional (meth)acrylate;
at least one multifunctional (meth)acrylate; and
at least one polyester-structure-containing polymer.
<2> The active-energy-ray-curable composition according to <1>, further including
a polymer obtained through polymerization of at least one selected from the group consisting of styrene, styrene derivatives, acrylic acid esters, and acrylic acid.
<3> The active-energy-ray-curable composition according to <1> or <2>, further including:
at least one polymerization initiator; and
at least one polymerization inhibitor,
wherein when an amount of the at least one polymerization initiator is defined as A % by mass, an amount of the at least one polymerization inhibitor is 0.01×A % by mass or more.
<4> The active-energy-ray-curable composition according to <3>, wherein the at least one polymerization inhibitor has two hydroxyl groups in a molecule of the at least one polymerization inhibitor.
<5> The active-energy-ray-curable composition according to any one of <1> to <4>,
wherein the at least one monofunctional (meth)acrylate has Stimulation Index of less than 3.
<6> The active-energy-ray-curable composition according to any one of <1> to <5>,
wherein the at least one multifunctional (meth)acrylate has Stimulation Index of less than 3.
<7> The active-energy-ray-curable composition according to any one of <1> to <6>,
wherein a weight average molecular weight of the polyester-structure-containing polymer is 100,000 or less.
<8> The active-energy-ray-curable composition according to any one of <1> to <7>,
wherein an amount of the polyester-structure-containing polymer is 10 parts by mass or more but 20 parts by mass or less relative to 100 parts by mass of a total of the at least one monofunctional (meth)acrylate and the at least one multifunctional (meth)acrylate.
<9> The active-energy-ray-curable composition according to any one of <1> to <8>,
wherein an amount of polyester portions in the polyester-structure-containing polymer is 50% by mass or less relative to a total amount of the polyester-structure-containing polymer.
<10> The active-energy-ray-curable composition according to any one of <1> to <9>,
wherein an amount of the at least one monofunctional (meth)acrylate is 50 parts by mass or more but 85 parts by mass or less relative to 100 parts by mass of a total of the at least one monofunctional (meth)acrylate and the at least one multifunctional (meth)acrylate.
<11> The active-energy-ray-curable composition according to any one of <1> to <10>,
wherein an amount of the at least one multifunctional (meth)acrylate is 15 parts by mass or more but 50 parts by mass or less relative to 100 parts by mass of a total of the at least one monofunctional (meth)acrylate and the at least one multifunctional (meth)acrylate.
<12> The active-energy-ray-curable composition according to any one of <1> to <11>,
wherein a viscosity of the active-energy-ray-curable composition at 25° C. is 5 mPa·s or more but 18 mPa·s or less.
<13> The active-energy-ray-curable composition according to any one of <1> to <12>,
wherein the active-energy-ray-curable composition is a material for forming a three-dimensional object.
<14> The active-energy-ray-curable composition according to any one of <1> to <13>,
wherein the active-energy-ray-curable composition is an ink for inkjet.
<15> A composition stored container including:
the active-energy-ray-curable composition according to any one of <1> to <14>; and
a container storing the active-energy-ray-curable composition.
<16> A two-dimensional or three-dimensional image forming apparatus including
the composition stored container according to <15>.
<17> A method for forming a two-dimensional or three-dimensional image, the method including
irradiating the active-energy-ray-curable composition according to any one of <1> to <14> with active energy rays.
<18> The method for forming a two-dimensional or three-dimensional image according to <17>, the method further including
ejecting the active-energy-ray-curable composition onto a polyethylene terephthalate substrate that is not surface-treated.
<19> A cured product including:
a substrate; and
a cured film disposed on the substrate,
wherein the cured film is obtained through curing by irradiating the active-energy-ray-curable composition according to any one of <1> to <14> with active energy rays.
<20> The cured product according to <19>,
wherein the substrate is a polyethylene terephthalate substrate, and the cured film includes the at least one monofunctional (meth)acrylate, the at least one multifunctional (meth)acrylate, and the at least one polyester-structure-containing polymer, and wherein close adhesiveness between the polyethylene terephthalate substrate and the cured film is 1 kPa or more.

The active-energy-ray-curable composition according to any one of <1> to <14>, the composition stored container according to <15>, the two-dimensional or three-dimensional image forming apparatus according to <16>, the method for forming a two-dimensional or three-dimensional image according to <17> or <18>, and the cured product according to <19> or <20> can solve the existing problems, and can achieve the object of the present disclosure.

What is claimed is:

1. An active-energy-ray-curable composition comprising:
   at least one monofunctional (meth)acrylate;
   at least one multifunctional (meth)acrylate; and
   at least one polyester-structure-containing polymer,
   wherein an amount of polyester portions in the polyester-structure-containing polymer is 50% by mass or less relative to a total amount of the polyester-structure-containing polymer.
2. The active-energy-ray-curable composition according to claim 1, further comprising
   a polymer obtained through polymerization of at least one selected from the group consisting of styrene, styrene derivatives, acrylic acid esters, and acrylic acid.
3. The active-energy-ray-curable composition according to claim 1, further comprising:
   at least one polymerization initiator; and
   at least one polymerization inhibitor,
   wherein when an amount of the at least one polymerization initiator is defined as A % by mass, an amount of the at least one polymerization inhibitor is 0.01×A % by mass or more.
4. The active-energy-ray-curable composition according to claim 3,
   wherein the at least one polymerization inhibitor has two hydroxyl groups in a molecule of the at least one polymerization inhibitor.
5. The active-energy-ray-curable composition according to claim 1,
   wherein the at least one monofunctional (meth)acrylate has Stimulation Index of less than 3.
6. The active-energy-ray-curable composition according to claim 1,
   wherein the at least one multifunctional (meth)acrylate has Stimulation Index of less than 3.
7. The active-energy-ray-curable composition according to claim 1,
   wherein a weight average molecular weight of the polyester-structure-containing polymer is 100,000 or less.
8. The active-energy-ray-curable composition according to claim 1,
   wherein an amount of the polyester-structure-containing polymer is 10 parts by mass or more but 20 parts by mass or less relative to 100 parts by mass of a total of the at least one monofunctional (meth)acrylate and the at least one multifunctional (meth)acrylate.
9. The active-energy-ray-curable composition according to claim 1,
   wherein an amount of the at least one monofunctional (meth)acrylate is 50 parts by mass or more but 85 parts by mass or less relative to 100 parts by mass of a total of the at least one monofunctional (meth)acrylate and the at least one multifunctional (meth)acrylate.
10. The active-energy-ray-curable composition according to claim 1,
    wherein an amount of the at least one multifunctional (meth)acrylate is 15 parts by mass or more but 50 parts by mass or less relative to 100 parts by mass of a total of the at least one monofunctional (meth)acrylate and the at least one multifunctional (meth)acrylate.
11. The active-energy-ray-curable composition according to claim 1,
    wherein a viscosity of the active-energy-ray-curable composition at 25° C. is 5 mPa·s or more but 18 mPa·s or less.
12. The active-energy-ray-curable composition according to claim 1,
    wherein the active-energy-ray-curable composition is a material for forming a three-dimensional object.
13. The active-energy-ray-curable composition according to claim 1,
    wherein the active-energy-ray-curable composition is an ink for inkjet.
14. A composition stored in a container comprising:
    the active-energy-ray-curable composition according to claim 1; and
    a container storing the active-energy-ray-curable composition.
15. A two-dimensional or three-dimensional image forming apparatus comprising
    the composition stored container according to claim 14.
16. A method for forming a two-dimensional or three-dimensional image, the method comprising
    irradiating an active-energy-ray-curable composition with active energy rays,
    wherein the active-energy-ray-curable composition comprises:
    at least one monofunctional (meth)acrylate;
    at least one multifunctional (meth)acrylate; and
    at least one polyester-structure-containing polymer,
    wherein an amount of polyester portions in the polyester-structure-containing polymer is 50% by mass or less relative to a total amount of the polyester-structure-containing polymer.
17. The method for forming a two-dimensional or three-dimensional image according to claim 16, the method further comprising
    ejecting the active-energy-ray-curable composition onto a polyethylene terephthalate substrate that is not surface-treated.
18. A cured product comprising:
    a substrate; and
    a cured film disposed on the substrate,
    wherein the cured film is obtained through curing by irradiating an active-energy-ray-curable composition with active energy rays, and
    wherein the active-energy-ray-curable composition comprises:
    at least one monofunctional (meth)acrylate;
    at least one multifunctional (meth)acrylate; and
    at least one polyester-structure-containing polymer,
    wherein an amount of polyester portions in the polyester-structure-containing polymer is 50% by mass or less relative to a total amount of the polyester-structure-containing polymer.
19. The cured product according to claim 18,
    wherein the substrate is a polyethylene terephthalate substrate, and the cured film comprises the at least one monofunctional (meth)acrylate, the at least one multifunctional (meth)acrylate, and the at least one polyester-structure-containing polymer, and wherein close adhesiveness between the polyethylene terephthalate substrate and the cured film is 1 kPa or more.

* * * * *